(12) United States Patent
Mori et al.

(10) Patent No.: US 10,128,739 B2
(45) Date of Patent: Nov. 13, 2018

(54) POWER CONVERSION DEVICE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/545,749

(22) PCT Filed: Feb. 16, 2015

(86) PCT No.: PCT/JP2015/054111
§ 371 (c)(1),
(2) Date: Jul. 24, 2017

(87) PCT Pub. No.: WO2016/132426
PCT Pub. Date: Aug. 25, 2016

(65) Prior Publication Data
US 2018/0006547 A1    Jan. 4, 2018

(51) Int. Cl.
| | | |
|---|---|---|
| *H02P 21/00* | (2016.01) | |
| *H02P 1/46* | (2006.01) | |
| *H02M 1/14* | (2006.01) | |
| *H02P 27/06* | (2006.01) | |
| *H02P 21/22* | (2016.01) | |
| *H02P 25/03* | (2016.01) | |
| *H02M 1/088* | (2006.01) | |

(Continued)

(52) U.S. Cl.
CPC .............. *H02M 1/14* (2013.01); *H02M 1/088* (2013.01); *H02M 7/539* (2013.01); *H02P 21/22* (2016.02); *H02P 25/03* (2016.02); *H02P 27/06* (2013.01); *H02P 25/22* (2013.01)

(58) Field of Classification Search
None
See application file for complete search history.

(56) References Cited

U.S. PATENT DOCUMENTS

2010/0026220 A1  2/2010  Sakai
2013/0285591 A1* 10/2013  Suzuki .................... H02P 25/22
                                                      318/724

FOREIGN PATENT DOCUMENTS

| JP | 2001-327173 A | 11/2001 |
|---|---|---|
| JP | 2010-57350 A | 3/2010 |
| JP | 5354369 B2 | 11/2013 |

OTHER PUBLICATIONS

International Search Report for PCT/JP2015/054111, dated Apr. 28, 2015.

* cited by examiner

*Primary Examiner* — Bentsu Ro
*Assistant Examiner* — Zemenay Truneh
(74) *Attorney, Agent, or Firm* — Sughrue Mion, PLLC; Richard C. Turner

(57) ABSTRACT

A first offset voltage which is added to voltage commands in a first three-phase voltage command calculated on the basis of a control command for an AC rotary machine, and a second offset voltage which is added to voltage commands in a second three-phase voltage command calculated on the basis of a control command for the AC rotary machine, are set in such a manner that a period during which one of a first power converter and a second power converter outputs an effective vector and the other thereof outputs a zero vector occurs during a carrier period of a first carrier wave signal and a second carrier wave signal.

13 Claims, 19 Drawing Sheets

(51) Int. Cl.
*H02M 7/539* (2006.01)
*H02P 25/22* (2006.01)

FIG. 6

| Qup 1 | Qun 1 | Qvp 1 | Qvn 1 | Qwp 1 | Qwn 1 | FIRST VOLTAGE VECTOR | Iinv1 |
|---|---|---|---|---|---|---|---|
| 0 | 1 | 0 | 1 | 0 | 1 | V0(1) | 0 |
| 1 | 0 | 0 | 1 | 0 | 1 | V1(1) | Iu1 |
| 1 | 0 | 1 | 0 | 0 | 1 | V2(1) | -Iw1 |
| 0 | 1 | 1 | 0 | 0 | 1 | V3(1) | Iv1 |
| 0 | 1 | 1 | 0 | 1 | 0 | V4(1) | -Iu1 |
| 0 | 1 | 0 | 1 | 1 | 0 | V5(1) | Iw1 |
| 1 | 0 | 0 | 1 | 1 | 0 | V6(1) | -Iv1 |
| 1 | 0 | 1 | 0 | 1 | 0 | V7(1) | 0 |

FIG. 7

| Qup 2 | Qun 2 | Qvp 2 | Qvn 2 | Qwp 2 | Qwn 2 | SECOND VOLTAGE VECTOR | Iinv2 |
|---|---|---|---|---|---|---|---|
| 0 | 1 | 0 | 1 | 0 | 1 | V0(2) | 0 |
| 1 | 0 | 0 | 1 | 0 | 1 | V1(2) | Iu2 |
| 1 | 0 | 1 | 0 | 0 | 1 | V2(2) | -Iw2 |
| 0 | 1 | 1 | 0 | 0 | 1 | V3(2) | Iv2 |
| 0 | 1 | 1 | 0 | 1 | 0 | V4(2) | -Iu2 |
| 0 | 1 | 0 | 1 | 1 | 0 | V5(2) | Iw2 |
| 1 | 0 | 0 | 1 | 1 | 0 | V6(2) | -Iv2 |
| 1 | 0 | 1 | 0 | 1 | 0 | V7(2) | 0 |

POWER CONVERSION DEVICE

CROSS REFERENCE TO RELATED APPLICATIONS

This application is a National Stage of International Application No. PCT/JP2015/054111 filed Feb. 16, 2015, the contents of all of which are incorporated herein by reference in their entirety.

TECHNICAL FIELD

The present invention relates to a power conversion device which seeks to further reduce the ripple current of a capacitor provided in order to achieve a stable DC current by suppressing variation in a bus line current flowing into a power converter.

BACKGROUND ART

A method for suppressing the ripple current of a capacitor in a power conversion device has been proposed in the prior art (see, for example, PTL 1). Specifically, the prior art described in PTL 1 discloses the following technology.

In other words, a switching reference signal set to a prescribed phase difference is used in a plurality of inverter sections, to control switching of low potential-side switching elements and high potential-side switching elements corresponding to respective phases. Furthermore, in at least one of the plurality of inverter sections, the neutral point voltage, which is the average value of the voltages applied to each phase in the coil group of the rotary machine, is controlled in accordance with the phase difference, in such a manner that the center of a zero-voltage vector generation period, which is the timing at which either the low potential-side switching elements or the high potential-side switching elements are all on and the other thereof are all off, is displaced with respect to the zero-voltage vector generation period in the other inverter section. By controlling the voltage in this way, the ripple current in the capacitor is reduced.

Subsequently, when the duty ratio calculated by the control unit is equal to or lower than a first prescribed value, the vibration and noise are reduced by controlling the neutral point voltage so as to be half the capacitor voltage applied to the capacitor.

CITATION LIST

Patent Literature

[PTL 1] Japanese Patent No. 5354369

SUMMARY OF INVENTION

Technical Problem

The problems of the prior art which have been the subject of new focus by the present inventors are described in detail in the embodiments, but a summary thereof is given below.

More specifically, in the prior art technology disclosed in PTL 1, if the phase difference of the switching reference signal of the two inverter sections is set to 180 degrees, and the neutral point voltage is then controlled so as to be half the capacitor voltage, then a state where the voltage vectors output by the two inverter sections are simultaneously effective vectors, and a state where the two inverter sections are simultaneously zero vectors, are repeated.

In this way, there is a problem in that the ripple current of the capacitor becomes excessively large, as a result of the repetition of a state where the voltage vectors output by the two inverter sections are simultaneously effective vectors and a state where the voltage vectors output by the two inverter sections are simultaneously zero vectors.

The present invention was devised in order to resolve the problem described above, an object thereof being to provide a power conversion device which is capable of further reducing the ripple current of a capacitor, while maintaining the effect of reducing vibrations and noise.

Solution to Problem

The power conversion device of the present invention is a power conversion device to which a DC power source which outputs DC voltage and an AC rotary machine having a first three-phase coil and a second three-phase coil are connected, this power conversion device including: a first power converter having a first high potential-side switching element and a first low potential-side switching element, and converting the DC voltage supplied from the DC power source into an AC voltage and applying the converted first AC voltage to the first three-phase coil; a second power converter having a second high potential-side switching element and a second low potential-side switching element, and converting the DC voltage supplied from the DC power source into an AC voltage and applying the converted second AC voltage to the second three-phase coil; and a control unit which respectively controls the first high potential-side switching element and the first low potential-side switching element, and the second high potential-side switching element and the second low potential-side switching element, wherein the control unit includes: a voltage command calculator which calculates a first three-phase voltage command for the first three-phase coil and a second three-phase voltage command for the second three-phase coil on the basis of a control command to the AC rotary machine, and outputs the calculated first three-phase voltage command and the second three-phase voltage command; an offset calculator which calculates a first three-phase application voltage to be applied to the first three-phase coil by adding a first offset voltage having a value equal to or lower than the DC voltage to each voltage command in the first three-phase voltage command input from the voltage command calculator, and outputs the calculated first three-phase application voltage, and also calculates a second three-phase application voltage to be applied to the second three-phase coil by adding a second offset voltage having a value equal to or lower than the DC voltage to each voltage command in the second three-phase voltage command input from the voltage command calculator, and outputs the calculated second three-phase application voltage; and a switching signal generator which outputs a first switching signal to the first high potential-side switching element and the first low potential-side switching element by comparing the first three-phase application voltage input from the offset calculator with a first carrier wave signal, and outputs a second switching signal to the second high potential-side switching element and the second low potential-side switching element by comparing the second three-phase application voltage input from the offset calculator with a second carrier wave signal having the same carrier period as that of the first carrier wave signal and having a phase difference of 180° with respect to the first carrier wave signal; and the first power converter applies the converted first AC voltage to the first three-phase coil by controlling the first high potential-side switching element and the first low potential-side switching element in accordance with the first switching signal input from the switching signal generator; and applies the converted second AC voltage to the second three-phase coil by controlling the second high potential-side switching element and the second low potential-side switching element in accordance with the second switching signal input from the switching signal generator; and when a vector comprising the output voltages of each phase in a case where the converted first AC voltage is output by the first power converter is taken to be a first voltage vector, and when the first voltage vector in a case where a first bus line current flowing into the first power converter is 0 is taken to be a zero vector, and when the first voltage vector in a case where the first bus line current flowing into the first power converter is not 0 is taken to be an effective vector, and when a vector comprising output voltages of each phase in a case where the converted second AC voltage is output by the second power converter is taken to be a second voltage vector, and when the second voltage vector in a case where the second bus line current flowing into the second power converter is 0 is taken to be a zero vector, and moreover when the second voltage vector in a case where the second bus line current flowing into the second power converter is not 0 is taken to be an effective vector, the first offset voltage and the second offset voltage are set in such a manner that a period during which one of the first power converter and the second power converter outputs the effective vector and the other thereof outputs the zero vector occurs in the carrier period of the first carrier wave signal and the second carrier wave signal.

Advantageous Effects of Invention

According to the present invention, the first offset voltage and the second offset voltage are set in such a manner that a period during which one of the first power converter and the second power converter outputs an effective vector and the other thereof outputs a zero vector occurs in the carrier period of the first carrier wave signal and the second carrier wave signal. Therefore, it is possible to achieve a power conversion device which can further reduce ripple current in a capacitor, while maintaining the effects of reducing vibration and noise.

BRIEF DESCRIPTION OF DRAWINGS

FIG. 6 is an illustrative diagram for describing the relationship between the first switching signal, the first voltage vector and the first bus line current in the first embodiment of the present invention.

FIG. 7 is an illustrative diagram for describing the relationship between the second switching signal, the second voltage vector and the second bus line current in the first embodiment of the present invention.

DESCRIPTION OF EMBODIMENTS

Below, the power conversion device according to the present invention is described on the basis of preferred embodiments with reference to the drawings. In the illustration, parts which are the same or corresponding are labelled with the same numerals and repeated description thereof is omitted.

First Embodiment

Figure 1:
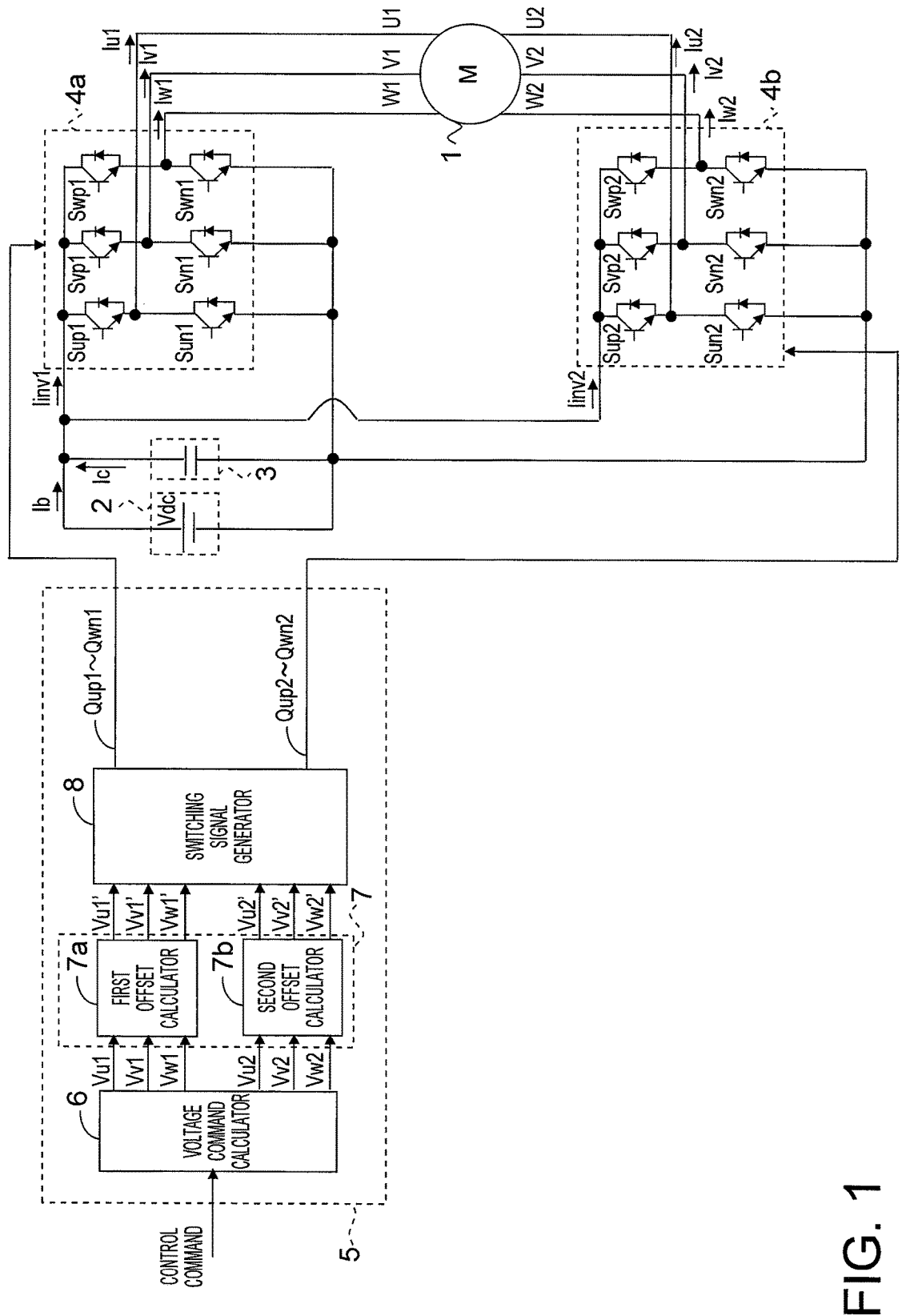
FIG. 1 is a schematic drawing showing the whole of a power conversion device according to a first embodiment of the present invention.

FIG. 1 is a schematic drawing showing the whole of a power conversion device according to a first embodiment of the present invention. FIG. 1 also shows an AC rotary machine 1 and a DC power source 2 which are connected to the power conversion device according to the first embodiment.

As illustrated in FIG. 1, the power conversion device according to the first embodiment comprises a smoothing capacitor 3, a first power converter 4a, a second power converter 4b and a control unit 5.

The AC rotary machine 1 is a three-phase AC rotary machine which has a first three-phase coil constituted by a U-phase coil U1, a V-phase coil V1 and a W-phase coil W1, and a second three-phase coil constituted by a U-phase coil U2, a V-phase coil V2 and a W-phase coil W2. Furthermore, in the AC rotary machine 1, the first three-phase coil and the second three-phase coil are housed in a stator, without being electrically connected.

Specific examples of an AC rotary machine 1 are a permanent magnet synchronous rotary machine, induction rotary machine or synchronous reluctance rotary machine, etc. The invention of the present application can be applied to an AC rotary machine of any type, provided that it is an AC rotary machine having two three-phase coils.

The DC power source 2 outputs a DC voltage Vdc to the first power converter 4a and the second power converter 4b. The DC power source 2 includes all devices which output a DC voltage, such as a battery, DC-DC converter, diode rectifier, PWM rectifier, etc.

The smoothing capacitor 3 is provided so as to be connected in parallel with the DC power source 2, in order to suppress variation in the bus line current and achieve a stable DC current. The smoothing capacitor 3 is not illustrated in detail in FIG. 1, but apart from the true capacitance C of the capacitor, there is an equivalent serial resistance Rc and a lead inductance Lc.

The first power converter 4a includes a reverse conversion circuit (in other words, an inverter). More specifically, the first power converter 4a includes a first high potential-side switching element which is configured from switching elements Sup1, Svp1 and Swp1, and a first low potential-side switching element which is configured from switching elements Sun1, Svn1 and Swn1.

Specific examples of the first high potential-side switching elements and the first low potential-side switching elements are IGBTs, semiconductor switches, such as bipolar transistors or MOS power transistors, or diodes connected inversely in parallel.

The first power converter 4a converts the DC voltage Vdc input from the DC power source 2, by controlling the on or off switching of the first high potential-side switching elements and the first low potential-side switching elements in accordance with a first switching signal input from the control unit 5. Furthermore, when the first power converter 4a applies the converted voltage to the first three-phase coil, a first three-phase current flows in the first three-phase coil. The first three-phase current comprises a U-phase current Iu1, a V-phase current Iv1 and a W-phase current Iw1.

In this respect, the first switching signal comprises switching signals Qup1 to Qwn1 (in other words, the switching signals Qup1, Qun1, Qvp1, Qvn1, Qwp1 and Qwn1). The switching signals Qup1, Qvp1 and Qwp1 are switching signals for switching the switching elements Sup1, Svp1 and Swp1 respectively on or off. Furthermore, the switching signals Qun1, Qvn1 and Qwn1 are switching signals for switching the switching elements Sun1, Svn1 and Swn1 respectively on or off.

Below, if the value is "1" in the switching signals Qup1 to Qwn1, then a signal for switching on the corresponding switching element is output, and if the value is "0", then a signal for switching off the corresponding switching element is output.

The second power converter 4b includes a reverse conversion circuit (in other words, an inverter). More specifically, the second power converter 4b includes a second high potential-side switching element which is configured from switching elements Sup2, Svp2 and Swp2, and a second low potential-side switching element which is configured from switching elements Sun2, Svn2 and Swn2.

Specific examples of the second high potential-side switching elements and the second low potential-side switching elements are IGBTs, semiconductor switches, such as bipolar transistors or MOS power transistors, or diodes connected inversely in parallel.

The second power converter 4b converts the DC voltage Vdc input from the DC power source 2, by controlling the on or off switching of the second high potential-side switching elements and the second low potential-side switching elements in accordance with a second switching signal input from the control unit 5. Furthermore, when the second power converter 4b applies the converted voltage to the second three-phase coil, a second three-phase current flows in the second three-phase coil. The second three-phase current comprises a U-phase current Iu2, a V-phase current Iv2 and a W-phase current Iw2.

In this respect, the second switching signal comprises switching signals Qup2 to Qwn2 (in other words, the switching signals Qup2, Qun2, Qvp2, Qvn2, Qwp2 and Qwn2). The switching signals Qup2, Qvp2 and Qwp2 are switching signals for switching the switching elements Sup2, Svp2 and Swp2 respectively on or off. Furthermore, the switching signals Qun2, Qvn2 and Qwn2 are switching signals for switching the switching elements Sun2, Svn2 and Swn2 respectively on or off.

Below, if the value is "1" in the switching signals Qup2 to Qwn2, then a signal for switching on the corresponding switching element is output, and if the value is "0", then a signal for switching off the corresponding switching element is output.

Figure 2:
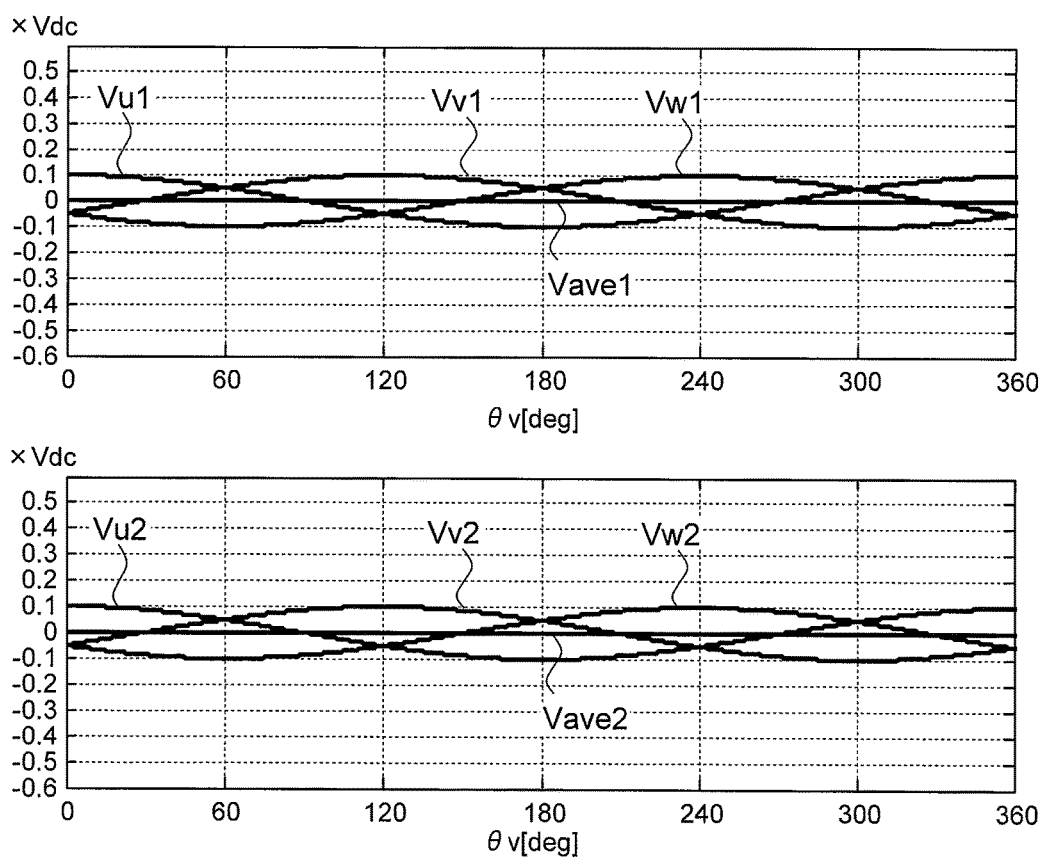
FIG. 2 is an illustrative diagram depicting a first three-phase voltage command and a second three-phase voltage command which are output from a voltage command calculator in the first embodiment of the present invention.
Figure 3:
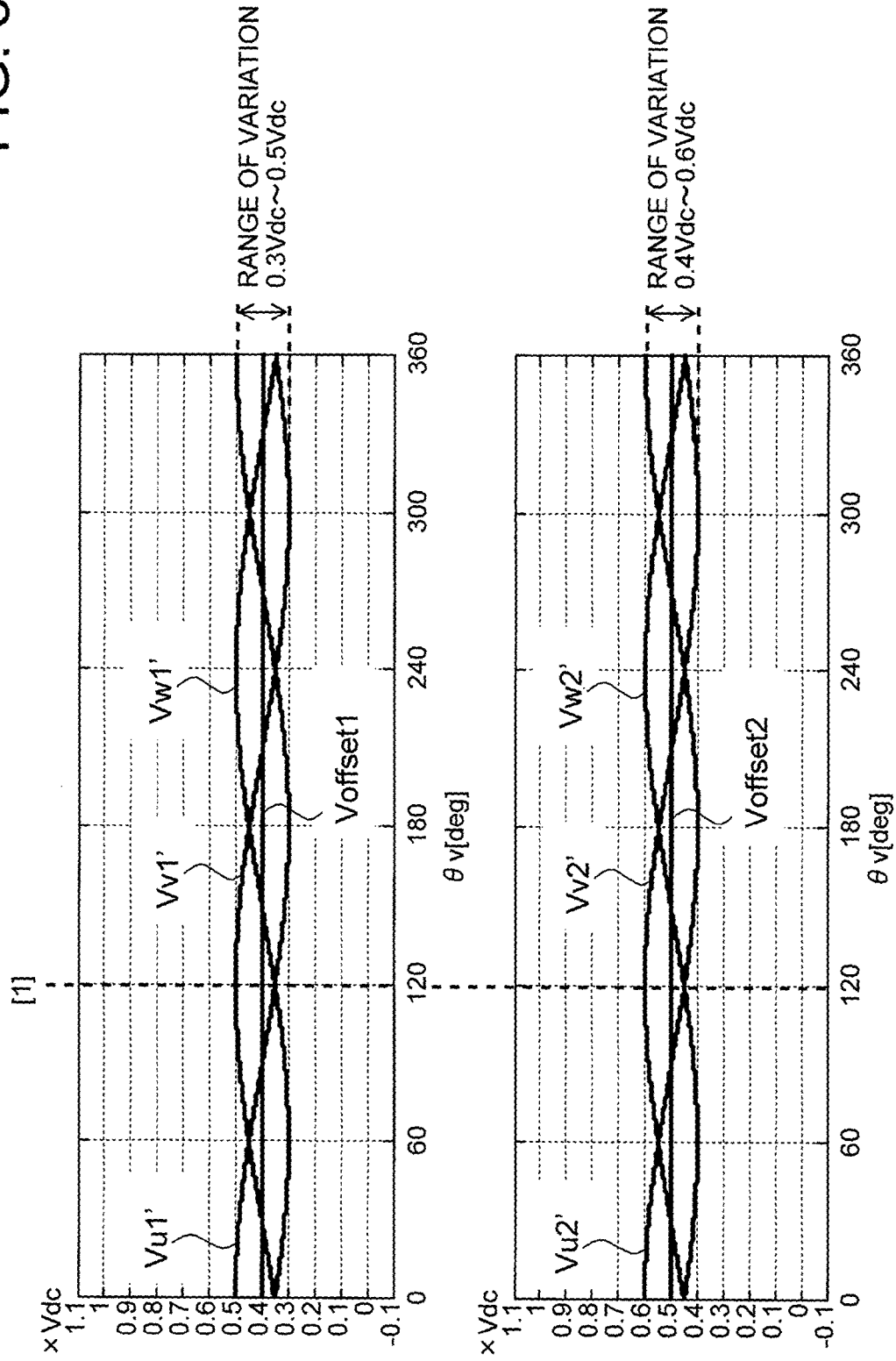
FIG. 3 is an illustrative diagram depicting a first three-phase application voltage and a second three-phase application voltage which are output from an offset calculator in the first embodiment of the present invention.
Figure 4:
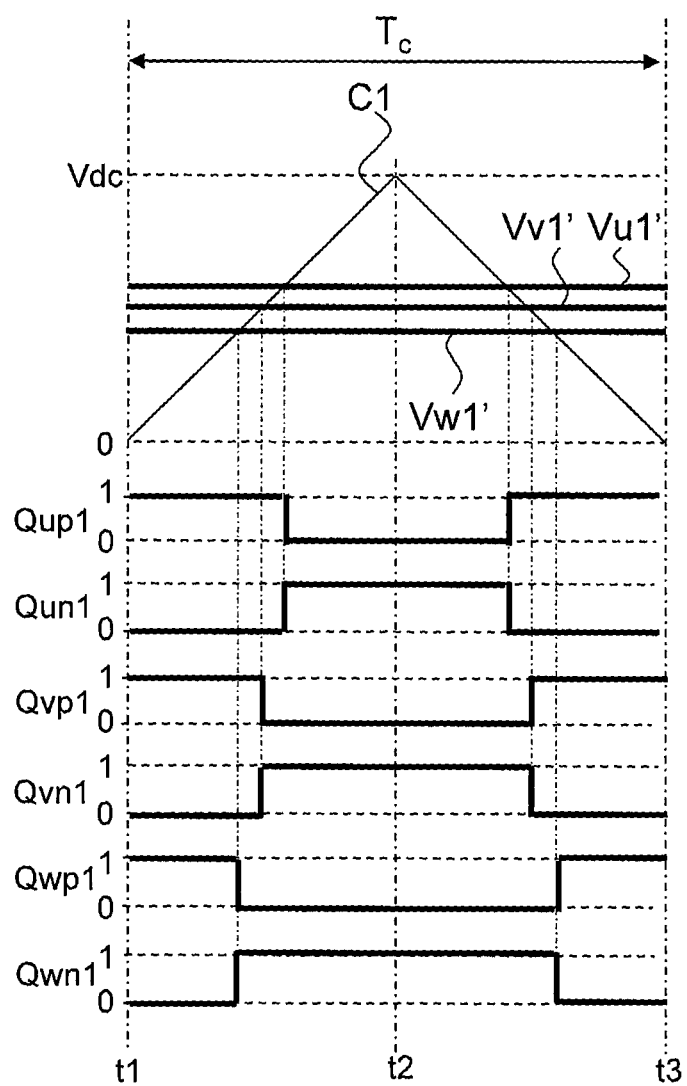
FIG. 4 is an illustrative diagram depicting a first switching signal which is output from a switching signal generator in the first embodiment of the present invention.
Figure 5:
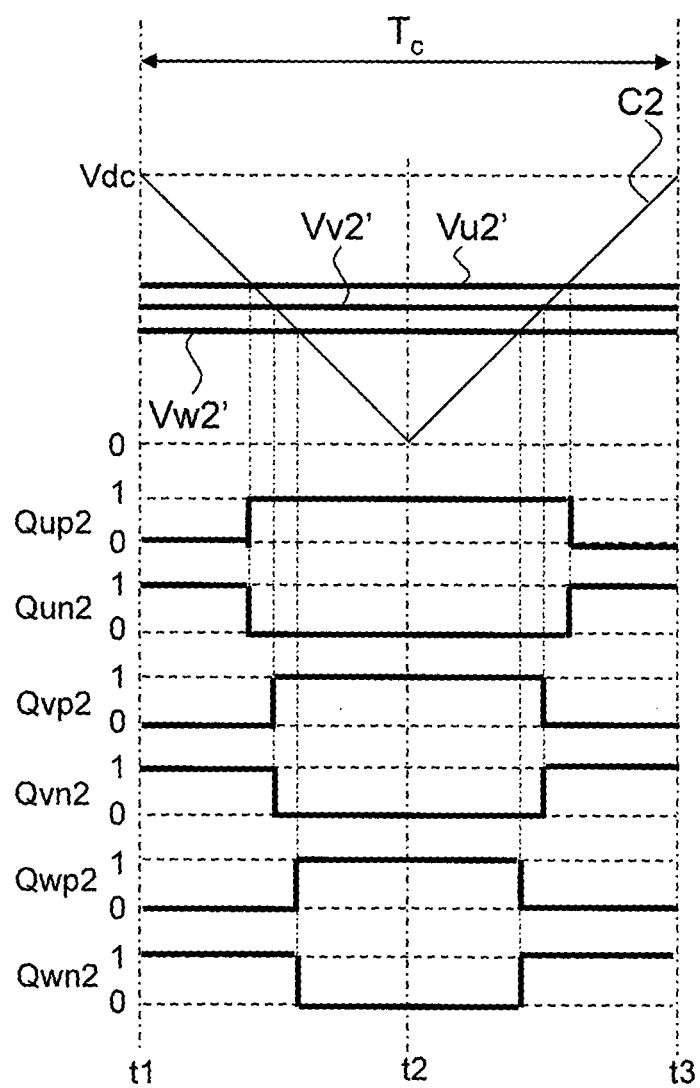
FIG. 5 is an illustrative diagram depicting a second switching signal which is output from a switching signal generator in the first embodiment of the present invention.

Next, the control unit 5 is described further with reference to FIG. 2 to FIG. 5, in addition to FIG. 1. FIG. 2 is an illustrative diagram depicting a first three-phase voltage command and a second three-phase voltage command which are output from a voltage command calculator 6 in a first embodiment of the present invention. FIG. 3 is an illustrative diagram depicting a first three-phase application voltage and a second three-phase application voltage which are output from an offset calculator 7 in a first embodiment of the present invention. FIG. 4 is an illustrative diagram depicting a first switching signal which is output from a switching signal generator 8 in the first embodiment of the present invention. FIG. 5 is an illustrative diagram depicting a second switching signal which is output from the switching signal generator 8 in the first embodiment of the present invention.

As illustrated in FIG. 1, the control unit 5 includes a voltage command calculator 6, an offset calculator 7 including a first offset calculator 7a and a second offset calculator 7b, and a switching signal generator 8.

The voltage command calculator 6 calculates a first three-phase voltage command for the first three-phase coil and a second three-phase voltage command for the second three-phase coil, on the basis of a control command input to an AC rotary machine 1, as voltage commands for applying voltages to the first three-phase coil and the second three-phase coil in order to drive the AC rotary machine 1. Furthermore, the voltage command calculator 6 outputs the calculated first three-phase voltage command to the first offset calculator 7a, and outputs the calculated second three-phase voltage command to the second offset calculator 7b.

The first three-phase voltage command comprises a U-phase voltage command Vu1, a V-phase voltage command Vv1 and a W-phase voltage command Vw1. Furthermore, the second three-phase voltage command comprises a U-phase voltage command Vu2, a V-phase voltage command Vv2 and a W-phase voltage command Vw2.

In this respect, the specific calculation method for the first three-phase voltage command and the second three-phase voltage command performed by the voltage command calculator 6 is well known, and therefore detailed description thereof is omitted here, but the following examples thereof may be cited.

For example, a method may be cited in which the amplitude of the first three-phase voltage command and the second three-phase voltage command is determined after setting a frequency command f for the AC rotary machine 1, as a control command for the AC rotary machine 1 which is input to the voltage command calculator 6. In other words, the voltage command calculator 6 calculates the first three-phase voltage command and the second three-phase voltage command by V/F control.

The V/F control is feed-forward control. Consequently, the voltage command calculator 6 does not require information relating to the first three-phase current and the second three-phase current, when calculating the first three-phase voltage command and the second three-phase voltage command by V/F control. Accordingly, in this case, the information relating to the first three-phase current and the second three-phase current does not have to be input to the voltage command calculator 6.

Furthermore, in a further example, a current detector for detecting the first three-phase current and the second three-phase current is provided, and the current command for the AC rotary machine 1 is set as a control command for the AC rotary machine 1 which is input to the voltage command calculator 6. In this case, the voltage command calculator 6 calculates the first three-phase voltage command by proportional integral control such that the deviation between the set current command and the first three-phase current detected by the current detector is zero. Furthermore, the voltage command calculator 6 calculates the second three-phase voltage command by proportional integral control such that the deviation between the set current command and the second three-phase current detected by the current detector is zero. In other words, the voltage command calculator 6 calculates the first three-phase voltage command and the second three-phase voltage command by current feedback control.

The waveforms of the respective voltage commands in the first three-phase voltage command are depicted in the upper portion of FIG. 2 and the waveforms of the respective voltage commands in the second three-phase voltage command are depicted in the lower portion of FIG. 2. Furthermore, in FIG. 2, the horizontal axis represents the voltage phase θv[deg] and the vertical axis represents the voltage value which is indicated as a multiple of the DC voltage Vdc. In FIG. 2, the first three-phase voltage command and the second three-phase voltage command are balanced three-phase AC voltages.

As illustrated in FIG. 2, the voltage commands in the first three-phase voltage command and the voltage commands in the second three-phase voltage command are sinusoidal waveforms with reference to 0. Furthermore, the voltage command average Vave1, which is the average value of the voltage commands in the first three-phase voltage command and the voltage command average Vave2, which is the average value of the voltage commands in the second three-phase voltage command, are both 0.

The voltage command average Vave1 and the voltage command average Vave2 are expressed by the following equations.

$$Vave1=(Vu1+Vv1+Vw1)/3$$

$$Vave2=(Vu2+Vv2+Vw2)/3$$

The first offset calculator 7a calculates the first three-phase application voltage to be applied to the first three-phase coil by adding a first offset voltage Voffset1 equally to each of the voltage commands of the first three-phase voltage command input from the voltage command calculator 6. Moreover, the first offset calculator 7a outputs the calculated first three-phase application voltage to the switching signal generator 8. The first three-phase application voltage comprises a U-phase application voltage Vu1', a V-phase application voltage Vv1' and a W-phase application voltage Vw1'.

The second offset calculator 7b calculates the second three-phase application voltage to be applied to the second three-phase coil by adding a second offset voltage Voffset2 equally to each of the voltage commands of the second three-phase voltage command input from the voltage command calculator 6. Moreover, the second offset calculator 7b outputs the calculated second three-phase application voltage to the switching signal generator 8. The second three-phase application voltage comprises a U-phase application voltage Vu2', a V-phase application voltage Vv2' and a W-phase application voltage Vw2'.

The waveforms of the respective voltages in the first three-phase application voltage are depicted in the upper portion of FIG. 3 and the waveforms of the respective voltages in the second three-phase application voltage are depicted in the lower portion of FIG. 3. Furthermore, in FIG. 3, the horizontal axis represents the voltage phase θv[deg] and the vertical axis represents the voltage value which is indicated as a multiple of the DC voltage Vdc.

As illustrated in FIG. 3 the application voltage average Vave1', which is the average value of the application voltages in the first three-phase application voltage, is equal to the first offset voltage Voffset1. Similarly, the application voltage average Vave2', which is the average value of the application voltages of the second three-phase application voltage, is equal to the second offset voltage Voffset2.

The first offset voltage Voffset1 and the second offset voltage Voffset2 are expressed by the following equations.

$$Voffset1 = Vave1' = (Vu1' + Vv1' + Vw1')/3$$
$$Voffset2 = Vave2' = (Vu2' + Vv2' + Vw2')/3$$

Furthermore, as illustrated in FIG. 3, the first offset voltage Voffset1 is set so as to assume a value of less than 50% of the DC voltage Vdc in at least one period of the electrical angle. Here, to give a specific example, the first offset voltage Voffset1 is 0.4 Vdc.

The second offset voltage Voffset2 is set so as to assume a value of 50% of the DC voltage Vdc in at least one period of the electrical angle. In other words, as illustrated in FIG. 3, the second offset voltage Voffset2 is 0.5 Vdc.

Furthermore, as illustrated in FIG. 2, since the range of variation of the first three-phase voltage command and the second three-phase voltage command is no less than −0.1 Vdc and no more than 0.1 Vdc, then as can be seen from FIG. 3, the range of variation of the first three-phase application voltage is no less than 0.3 Vdc and no more than 0.5 Vdc, and the range of variation of second three-phase application voltage is no less than 0.4 Vdc and no more than 0.6 Vdc.

The switching signal generator 8 outputs a first switching signal respectively to the first high potential-side switching elements and the first low potential-side switching elements by comparing the first three-phase application voltage input from the first offset calculator 7a with a first carrier wave signal C1. In other words, the switching signal generator 8 outputs switching signals Qup1 to Qwn1, in accordance with the application voltages in the first three-phase application voltage.

Furthermore, the switching signal generator 8 outputs a second switching signal respectively to the second high potential-side switching elements and the second low potential-side switching elements, by comparing the second three-phase application voltage input from the second offset calculator 7b with a second carrier wave signal C2 having a phase difference of 180° with respect to the first carrier wave signal C1. In other words, the switching signal generator 8 outputs switching signals Qup2 to Qwn2, in accordance with the application voltages in the second three-phase application voltage.

Furthermore, the maximum value of the first carrier wave signal C1 is set to be greater than the range of variation of the first three-phase application voltage, and the minimum value of the first carrier wave signal is set to be smaller than the range of variation of the first three-phase application voltage. Similarly, the maximum value of the second carrier wave signal C2 is set to be greater than the range of variation of the second three-phase application voltage, and the minimum value of the second carrier wave signal is set to be smaller than the range of variation of the second three-phase application voltage.

FIG. 4 shows the respective waveforms of the first carrier wave signal C1, the first three-phase application voltage, and the switching signals Qup1 to Qwn1.

As illustrated in FIG. 4, the first carrier wave signal C1 is a triangular wave having the carrier period Tc, and at timings t1 and t3, the voltage value is a minimum (here, 0) and at timing t2, which is midway between timing t1 and timing t3, the voltage value is a maximum (here, Vdc).

The switching signal generator 8 compares the application voltages in the first three-phase application voltage and the first carrier wave signal C1, and outputs switching signals Qup1 to Qwn1 in accordance with the comparison results.

More specifically, as a result of the comparison between the U-phase application voltage Vu1' and the first carrier wave signal C1, the switching signal generator 8 outputs "Qup1=1 and Qun1=0", if the U-phase application voltage Vu1' is in a range greater than the first carrier wave signal C1, and outputs "Qup1=0 and Qun1=1", if the U-phase application voltage Vu1' is in a range equal to or lower than the first carrier wave signal C1.

Similarly, as a result of the comparison between the V-phase application voltage Vv1' and the first carrier wave signal C1, the switching signal generator 8 outputs "Qvp1=1 and Qvn1=0", if the V-phase application voltage Vv1' is in a range greater than the first carrier wave signal C1, and outputs "Qvp1=0 and Qvn1=1", if the V-phase application voltage Vv1' is in a range equal to or lower than the first carrier wave signal C1.

Similarly, as a result of the comparison between the W-phase application voltage Vw1' and the first carrier wave signal C1, the switching signal generator 8 outputs "Qwp1=1 and Qwn1=0", if the W-phase application voltage Vw1' is in a range greater than the first carrier wave signal C1, and outputs "Qwp1=0 and Qwn1=1", if the W-phase application voltage Vw1' is in a range equal to or lower than the first carrier wave signal C1.

FIG. 5 shows the respective waveforms of the second carrier wave signal C2, the second three-phase application voltage, and the switching signals Qup2 to Qwn2.

As illustrated in FIG. 5, the second carrier wave signal C2 is a triangular wave having the carrier period Tc, and at timings t1 and t3, the voltage value is a maximum (here, Vdc) and at timing t2, which is midway between timing t1 and timing t3, the voltage value is a minimum (here, 0). Furthermore, the second carrier wave signal C2 has a phase difference of 180° with respect to the first carrier wave signal C1, when the carrier period Tc is represented by 360°.

The switching signal generator 8 compares the application voltages in the second three-phase application voltage and the second carrier wave signal C2, and outputs switching signals Qup2 to Qwn2 in accordance with the comparison results.

More specifically, as a result of the comparison between the U-phase application voltage Vu2' and the second carrier wave signal C2, the switching signal generator 8 outputs "Qup2=1 and Qun2=0", if the U-phase application voltage Vu2' is in a range greater than the second carrier wave signal C2, and outputs "Qup2=0 and Qun2=1", if the U-phase application voltage Vu2' is in a range equal to or lower than the second carrier wave signal C2. Similarly, as a result of the comparison between the V-phase application voltage Vv2' and the second carrier wave signal C2, the switching signal generator 8 outputs "Qvp2=1 and Qvn2=0", if the V-phase application voltage Vv2' is in a range greater than the second carrier wave signal C2, and outputs "Qvp2=0 and Qvn2=1", if the V-phase application voltage Vv2' is in a range equal to or lower than the second carrier wave signal C2.

Similarly, as a result of the comparison between the W-phase application voltage Vw2' and the second carrier wave signal C2, the switching signal generator 8 outputs "Qwp2=1 and Qwn2=0", if the W-phase application voltage Vw2' is in a range greater than the second carrier wave signal C2, and outputs "Qwp2=0 and Qwn2=1", if the W-phase application voltage Vw2' is in a range equal to or lower than the second carrier wave signal C2.

Next, the relationship between the switching signals Qup1 to Qwn1, the first voltage vector which is output by the first power converter 4a, and the first bus line current Iinv1 which flows into the first power converter 4a (see FIG. 1) is described with reference to FIG. 6. FIG. 6 is an illustrative diagram for describing the relationship between the first switching signal, the first voltage vector and the first bus line current Iinv1 in the first embodiment of the present invention.

The relationship illustrated in FIG. 6 is well known and therefore a detailed description is omitted here. Furthermore, the suffix (1) after the first voltage vectors is stated in order to represent the first voltage vectors, for the purpose of distinguishing same from the second voltage vectors which are described below.

In FIG. 6, if the first voltage vector is V0(1) and V7(1) in accordance with the values of the switching signals Qup1 to Qwn1, then the first bus line current Iinv1 is 0. Here, a voltage vector such as V0(1) and V7(1) at which the first bus line current Iinv1 becomes 0 is called a "zero vector". In this way, when the first voltage vector is a zero vector, the first bus line current Iinv1 is 0.

In FIG. 6, when the first voltage vector is a vector other than the zero vectors V0(1) and V7(1), namely, V1(1) to V6(1), then the first bus line current Iinv1 is not 0. Here, a voltage vector such as V1(1) to V6(1) at which the first bus line current Iinv1 does not become 0 is called an "effective vector". In this way, when the first voltage vector is an effective vector, the first bus line current Iinv1 is not 0.

Furthermore, if the first voltage vector is an effective vector, as illustrated in FIG. 6, then the first bus line current Iinv1 has a value equal to one of the currents in the first three-phase current, or to the value of one of the currents with the sign thereof inverted. In this case, if the one current is not 0, then the first bus line current Iinv1 is not 0.

In this way, the vector comprising the output voltages of the respective phases when the first power converter 4a outputs the converted AC voltage is taken to be a first voltage vector, and the first voltage vector is taken to be a zero vector when the first bus line current flowing into the first power converter 4a is 0 and the first voltage vector is taken to be an effective vector when the first bus line current flowing into the first power converter is not 0.

Next, the relationship between the switching signals Qup2 to Qwn2, the second voltage vector which is output by the second power converter 4b, and the second bus line current Iinv2 (illustrated in FIG. 1) which flows into the second power converter 4b is described with reference to FIG. 7. FIG. 7 is an illustrative diagram for describing the relationship between the second switching signal, the second voltage vector and the second bus line current Iinv2 in the first embodiment of the present invention.

The relationship illustrated in FIG. 7 is well known and therefore a detailed description is omitted here. Furthermore, the suffix (2) after the second voltage vectors is stated in order to represent the second voltage vectors, for the purpose of distinguishing same from the first voltage vectors.

In FIG. 7, if the second voltage vector is V0(2) and V7(2) in accordance with the values of the switching signals Qup2 to Qwn2, then the second bus line current Iinv2 is 0. Here, the voltage vector at which the first bus line current Iinv2, such as V0(2) and V7(2), becomes 0 is called the "zero vector". In this way, when the second voltage vector is a zero vector, the second bus line current Iinv2 is 0.

In FIG. 7, when the second voltage vector is a vector other than the zero vectors V0(2) and V7(2), namely, V1(2) to V6(2), then the second bus line current Iinv2 is not 0. Here, a voltage vector at which the second bus line current Iinv2, such as V1(2) to V6(2), is not 0 is called an "effective vector". In this way, when the second voltage vector is an effective vector, the second bus line current Iinv2 is not 0.

Furthermore, if the second voltage vector is an effective vector, as illustrated in FIG. 7, then the second bus line current Iinv2 has a value equal to one of the currents in the second three-phase current, or to the value of one of the currents with the sign thereof inverted. In this case, if the one current is not 0, then the second bus line current Iinv1 is not 0.

In this way, the vector comprising the output voltages of the respective phases when the second power converter 4b outputs the converted AC voltage is taken as a second voltage vector, and the second voltage vector is taken to be a zero vector when the second bus line current flowing into the second power converter is 0 and the second voltage vector is taken to be an effective vector when the second bus line current flowing into the second power converter is not 0.

Next, the relationship between the first carrier wave signal C1, the second carrier wave signal C2, the first three-phase application voltage, the second three-phase application voltage, the first bus line current Iinv1, the second bus line current Iinv2, and the bus line current sum Iinv_sum which is the sum of the first bus line current Iinv1 and the second bus line current Iinv2, is described with reference to FIG. 8 and FIG. 9.

Figure 8:
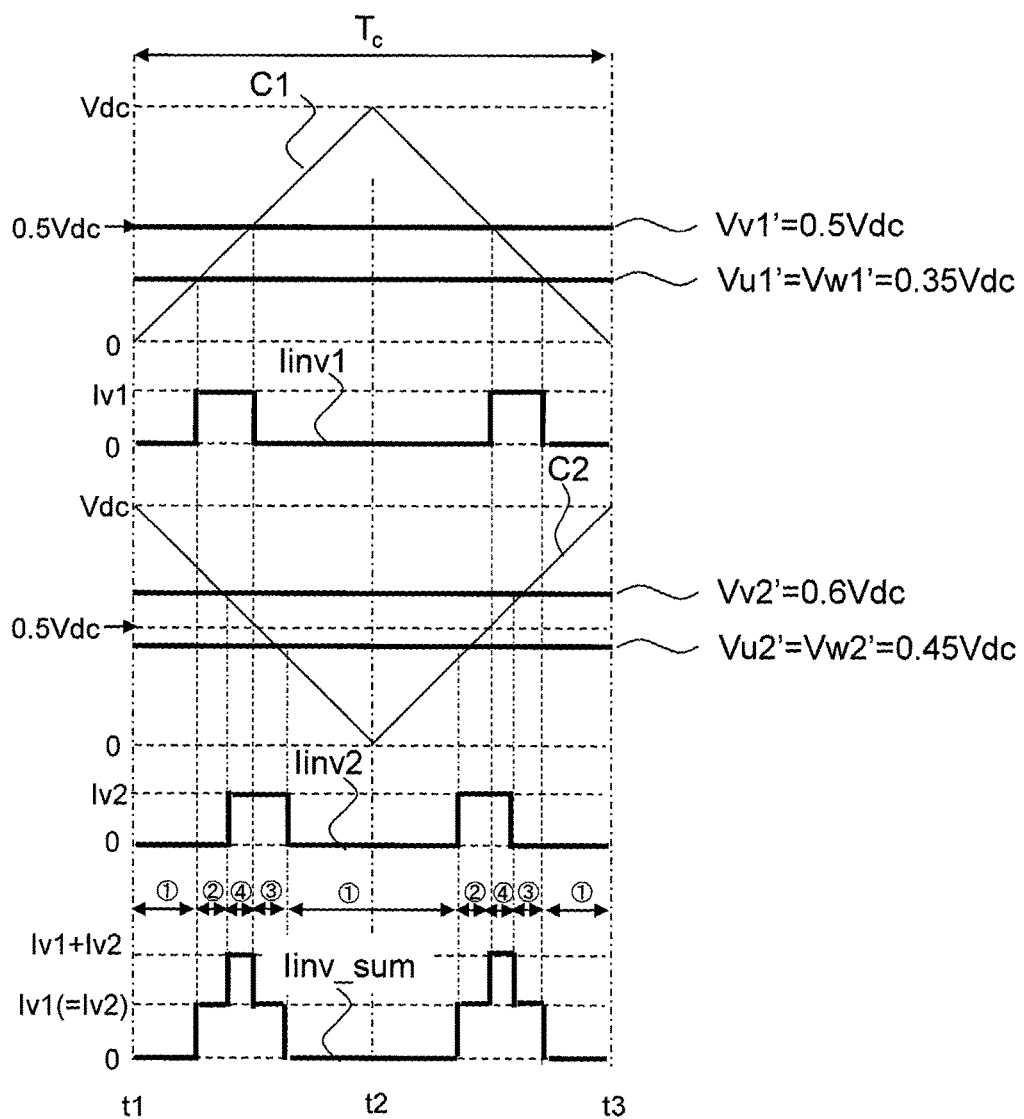
FIG. 8 is an illustrative diagram depicting the relationship between a first carrier wave signal, a second carrier wave signal, the first three-phase application voltage, the second three-phase application voltage, the first bus line current, the second bus line current, and the sum of the bus line current, in the first embodiment of the present invention.

FIG. 8 is an illustrative diagram illustrating a relationship between the first carrier wave signal C1, the second carrier wave signal C2, the first three-phase application voltage, the second three-phase application voltage, the first bus line current Iinv1, the second bus line current Iinv2 and the bus line current sum Iinv_sum, in the first embodiment of the present invention. FIG. 9 is an illustrative diagram for the purpose of comparison with FIG. 8.

Figure 9:
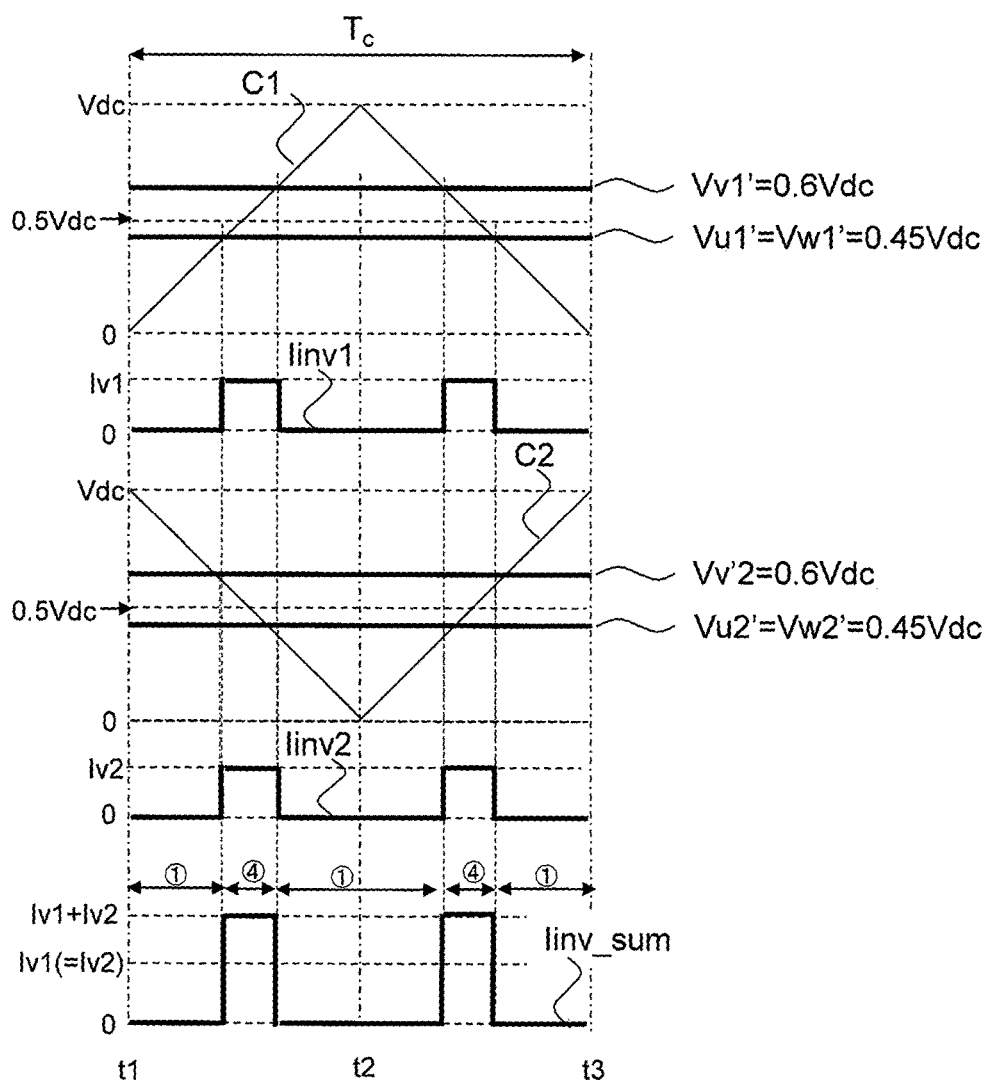
FIG. 9 is an illustrative diagram for the purpose of comparison with FIG. 8.

FIG. 8 and FIG. 9 show the relationship between respective parameters at the moment indicated by [1] in FIG. 3 described above.

FIG. 9 shows, as a comparative example, the relationship between the parameters in a case where the first offset voltage Voffset1 and the second offset voltage Voffset2 are both set to 0.5 Vdc. The indication that "the first offset voltage Voffset1 and the second offset voltage Voffset2 are both set to 0.5 Vdc" is equivalent to the indication in PTL 1 that "the neutral point voltage is controlled so as to be half the capacitor voltage which is applied to the capacitor".

Furthermore, in the carrier period Tc, in FIG. 8, Vv1'=0.5 Vdc, Vu1'=Vw1'=0.35 Vdc, Vv2'=0.6 Vdc, Vu2'=Vw2'=0.45 Vdc.

Furthermore, in the carrier period Tc, in FIG. 9, Vv1'=0.6 Vdc, Vu1'=Vw1'=0.45 Vdc, and similarly, Vv2'=0.6 Vdc, Vu2'=Vw2'=0.45 Vdc.

Here, the following modes <1> to <4> are defined in order to distinguish between the combinations of the type of the first voltage vector which is output by the first power converter 4a and the type of the second voltage vector which is output by the second power converter 4b, in the description of FIG. 8 and FIG. 9.

<1>:
The first power converter 4a and the second power converter 4b both output zero vectors.
<2>:
The first power converter 4a outputs an effective vector and the second power converter 4b outputs a zero vector.
<3>:
The first power converter 4a outputs a zero vector and the second power converter 4b outputs an effective vector.
<4>:
The first power converter 4a and the second power converter 4b both output effective vectors.

Next, the effects of the power conversion device according to the first embodiment are described by comparing FIG. 8 and FIG. 9. In the drawings, the circled suffixes 1-4 correspond to modes <1> to <4>.

In FIG. 9, the first three-phase application voltage and the second three-phase application voltage match in each phase because of the setting Voffset1=Voffset2=0.5 Vdc. In other words, Vu1'=Vu2', Vv1'=Vv2', Vw1'=Vw2'. Therefore, as illustrated in FIG. 9, mode <1> in which the bus line current sum Iinv_sum is 0, and mode <4> in which the bus line current sum Iinv_sum is Iv1+Iv2 are repeated.

On the other hand, in FIG. 8, Voffset1=0.4 Vdc and Voffset2=0.5 Vdc. By setting these values, as illustrated in FIG. 8, the period in which the first power converter 4a outputs an effective vector is shifted towards timing t1, compared to the timing at which the second power converter 4b outputs an effective vector, in the period between timing t1 and timing t2, and is shifted towards timing t3, in the period between timing t2 and timing t3.

Consequently, as illustrated in FIG. 9, during the carrier period Tc, mode <2> in which the bus line current sum Iinv_sum is (Iv1+Iv2)/2 and mode <3> in which the bus line current sum Iinv_sum is (Iv1+Iv2)/2 occur respectively two times each, as a result of which the duration of mode <4> decreases.

Figure 10:
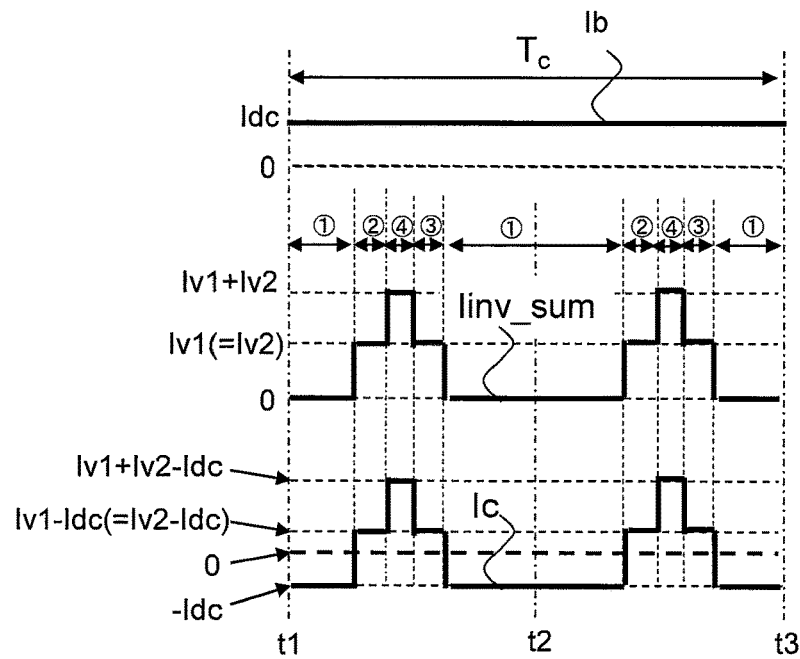
FIG. 10 is an illustrative diagram depicting a relationship between a DC current, which is the output current of the DC power source, a ripple current, which is an output current of a smoothing capacitor, and the sum of the bus line current, in the first embodiment of the present invention.
Figure 11:
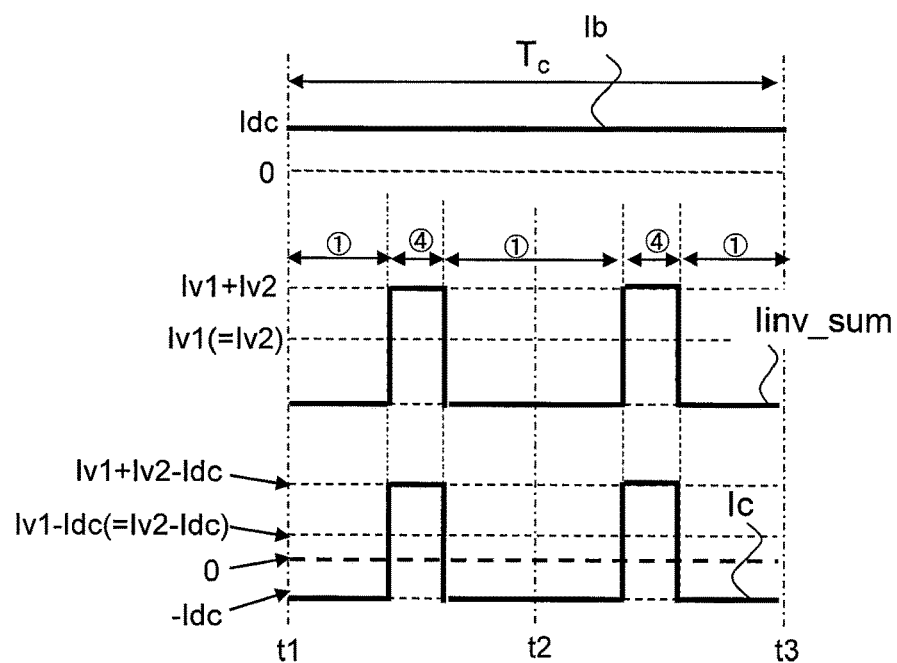
FIG. 11 is an illustrative diagram for the purpose of comparison with FIG. 10.

Next, the relationship between the DC current Ib of the DC power source 2, the ripple current Ic of the smoothing capacitor 3, and the bus line current sum Iinv_sum is described with reference to FIG. 10 and FIG. 11. FIG. 10 is an illustrative diagram illustrating the relationship between the DC current Ib, which is the output current of the DC power source 2, the ripple current Ic, which is the output current of the smoothing capacitor 3, and the bus line current sum Iinv_sum, in the first embodiment of the present invention. FIG. 11 is an illustrative diagram for the purpose of comparison with FIG. 10.

FIG. 10 shows the bus line current sum Iinv_sum depicted in FIG. 8, and FIG. 11 shows the bus line current sum Iinv_sum depicted in FIG. 9.

Here, as can be seen from FIG. 1 above, the relationship between the DC current Ib, the ripple current Ic and the bus line current sum Iinv_sum is represented by the following equations.

$$Iinv\_sum=Iinv1+Iinv2=Ib+Ic$$

Furthermore, if the DC current Ib is a uniform value Idc, then by rearranging the equation above, the ripple current Ic is expressed by the following equation.

$$Ic=Iinv1+Iinv2-Idc$$

With respect to FIG. 11, in FIG. 10, the duration of mode <4> is decreased, and therefore the period during which the peak value of the ripple current Ic (in other words, Iv1+Iv2 −Idc) is output is reduced. Furthermore, in FIG. 10, due to existence of periods of mode <2> and mode <3>, the duration of mode <4> is reduced, and the duration of mode <1> is also reduced. Consequently, the ripple current Ic of the smoothing capacitor 3 can be further decreased.

In this way, in the first embodiment, the first offset voltage Voffset1 and the second offset voltage Voffset2 are set in such a manner that, by generating a period in which mode <2> and mode <3> occur, in the carrier period Tc, the duration of mode <4> is reduced.

More specifically, in the first embodiment, the first offset voltage Voffset1 is set so as to be less than 0.5 Vdc and the second offset voltage Voffset2 is set so as to be 0.5 Vdc. Consequently, a period in which one of the first power converter 4a and the second power converter 4b outputs an effective torque and the other thereof outputs a zero vector occurs in the carrier period Tc.

In the first embodiment, a similar effect is obtained in cases where the first offset voltage Voffset1 is set so as to be greater than 0.5 Vdc, and the second offset voltage Voffset2 is set to 0.5 Vdc.

Furthermore, in the first embodiment, a similar effect is obtained in cases where the first offset voltage Voffset1 is set to 0.5 Vdc, and the second offset voltage Voffset2 is set to be greater than 0.5 Vdc or less than 0.5 Vdc.

Moreover, in the first embodiment, a case was described in which the first offset voltage Voffset1 is set to be 0.4 Vdc, but the duration of mode <4> can be reduced further by setting the first offset voltage Voffset1 to a value even smaller than 0.4 Vdc, and when a certain predetermined value is reached, a period of mode <4> ceases to occur in the carrier period Tc.

In this way, it is possible to further reduce the ripple current Ic by setting the first offset voltage Voffset1 and the second offset voltage Voffset2 in such a manner that a period in which both the first power converter 4a and the second power converter 4b are outputting an effective vector does not occur in the carrier period Tc.

Above, according to the first embodiment, the first offset voltage and the second offset voltage are set in such a manner that a period during which one of the first power converter and the second power converter outputs an effective vector and the other thereof outputs a zero vector occurs in the carrier period of the first carrier wave signal and the second carrier wave signal.

More specifically, one of the first offset voltage Voffset1 and the second offset voltage Voffset2 is set to a value of 50% of the DC voltage, and the other thereof is set to a value greater than 50% of the DC voltage or less than 50% of the DC voltage.

Consequently, since one of the first power converter and the second power converter can output an effective vector and the other thereof can output a zero vector, while maintaining the effect of reducing vibration and noise, then it is possible to further reduce the ripple current of the smoothing capacitor.

Second Embodiment

In the first embodiment above, a case is described in which one of the first offset voltage Voffset1 and the second offset voltage Voffset2 is set to 0.5 Vdc and the other thereof is set to a value greater than 0.5 Vdc or a value less than 0.5 Vdc. On the other hand, the second embodiment is described in relation to a case where the first offset voltage Voffset1 and the second offset voltage Voffset2 are both values greater than 0.5 Vdc, or are both values less than 0.5 Vdc.

In the second embodiment, points which are the same as the first embodiment above are not explained and the points which are different from the first embodiment will be described.

Here, an example is described in which the first offset voltage Voffset1 and the second offset voltage Voffset2 are respectively values less than 0.5 Vdc, and are both set to mutually equal values. To give a specific example, the first offset voltage Voffset1 and the second offset voltage Voffset2 are both 0.45 Vdc.

Figure 12:
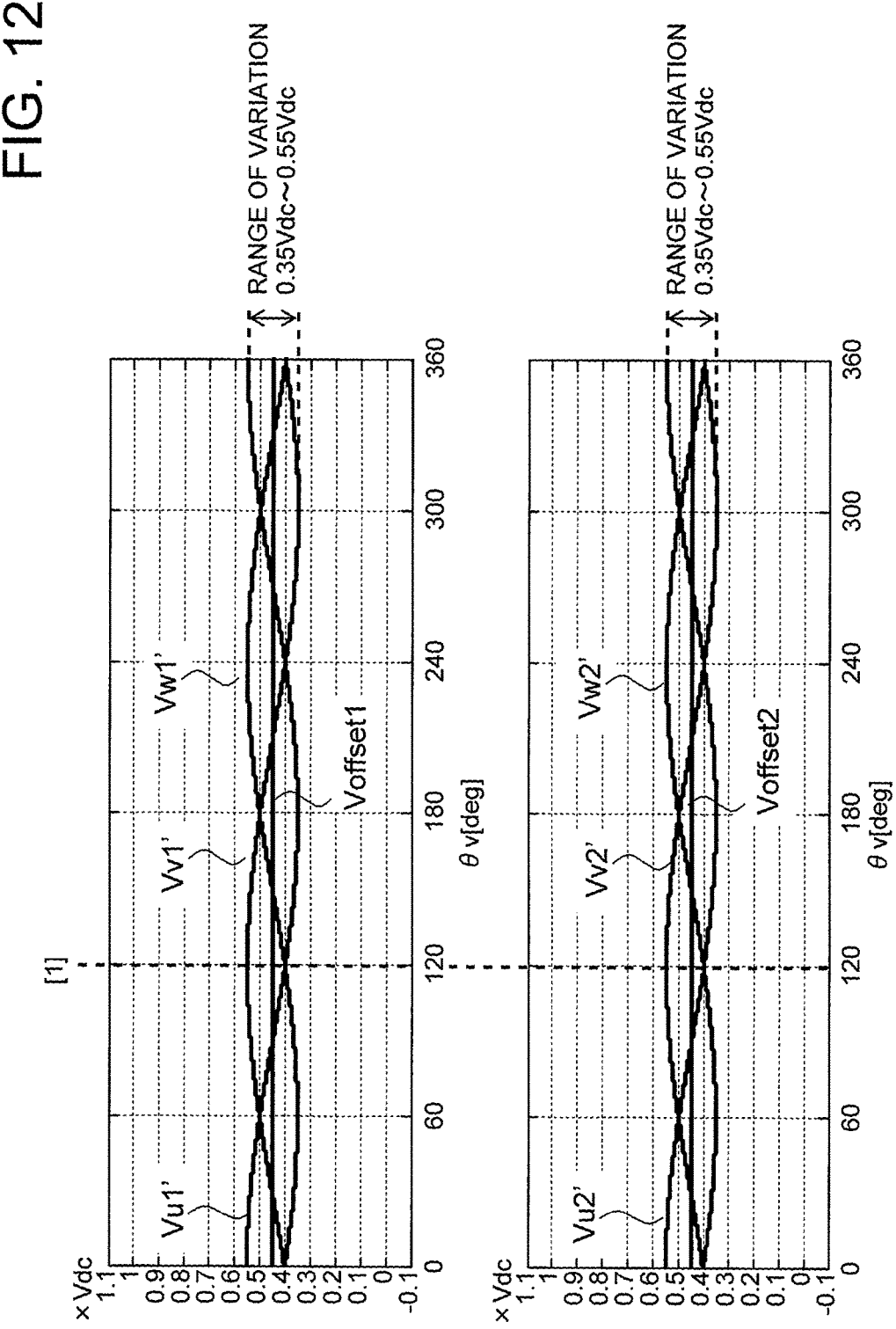
FIG. 12 is an illustrative diagram depicting a first three-phase application voltage and a second three-phase application voltage which are output from an offset calculator in a second embodiment of the present invention.

The first three-phase application voltage and the second three-phase application voltage which are output by the offset calculator 7 when the first offset voltage Voffset1 and the second offset voltage Voffset2 are set respectively to 0.45 Vdc will be described with reference to FIG. 12. FIG. 12 is an illustrative diagram depicting a first three-phase application voltage and a second three-phase application voltage which are output from the offset calculator 7 in the second embodiment of the present invention.

The waveforms of the respective application voltages in the first three-phase application voltage are depicted in the upper part of FIG. 12. Furthermore, the waveforms of the respective application voltages in the second three-phase application voltage are depicted in the lower part of FIG. 12. The first three-phase voltage command and the second three-phase voltage command are taken to be the same as the first embodiment above.

Furthermore, since the range of variation of the first three-phase voltage command and the second three-phase voltage command is no less than −0.1 Vdc and no more than 0.1 Vdc, then as can be seen from FIG. 12, the range of variation of the first three-phase application voltage is no less than 0.35 Vdc and no more than 0.55 Vdc, and the range of variation of second three-phase application voltage is no less than 0.35 Vdc and no more than 0.55 Vdc.

Figure 13:
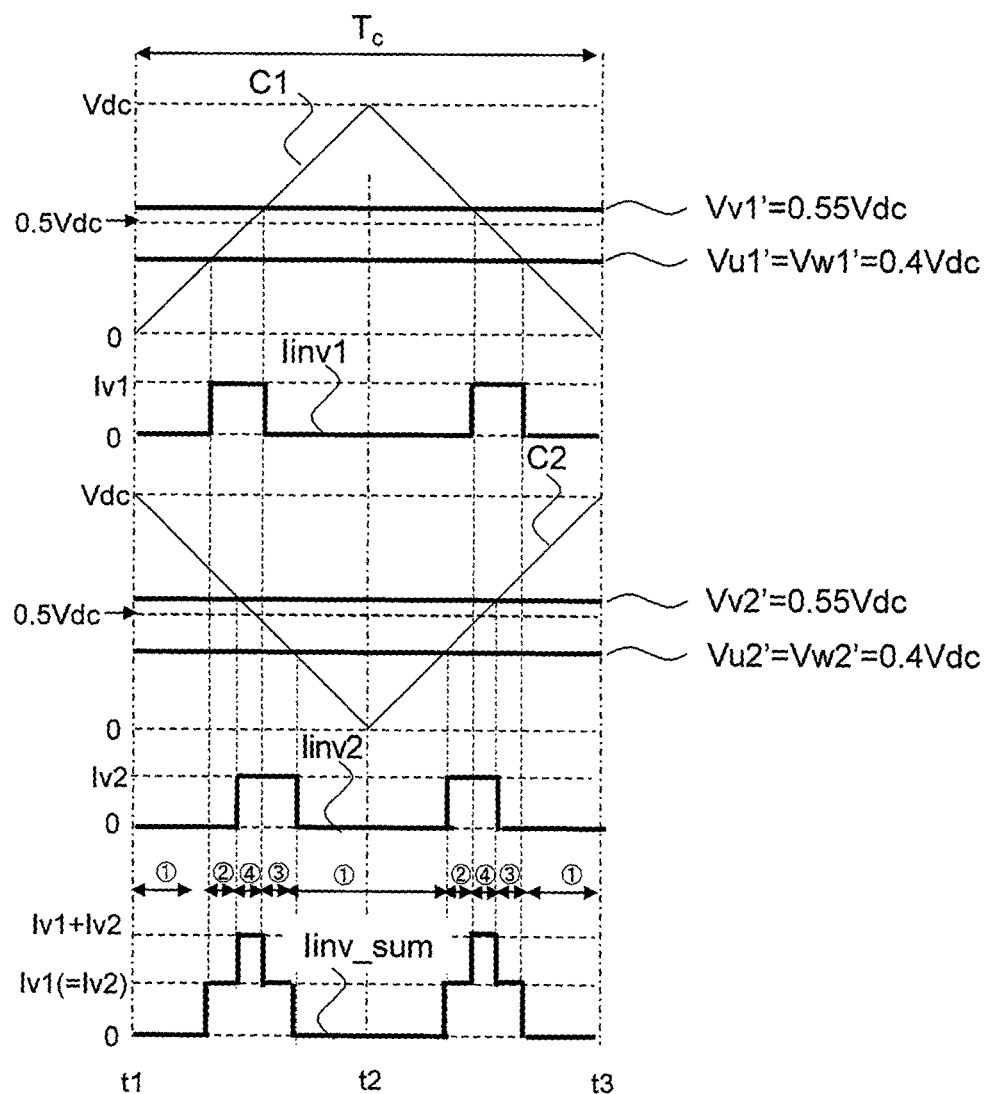
FIG. 13 is an illustrative diagram depicting the relationship between a first carrier wave signal, a second carrier wave signal, the first three-phase application voltage, the second three-phase application voltage, the first bus line current, the second bus line current, and the sum of the bus line current, in the second embodiment of the present invention.

Next, the relationship between the first carrier wave signal C1, the second carrier wave signal C2, the first three-phase application voltage, the second three-phase application voltage, the first bus line current Iinv1, the second bus line current Iinv2, and the bus line current sum Iinv_sum is described with reference to FIG. 13. FIG. 13 is an illustrative diagram illustrating a relationship between the first carrier wave signal C1, the second carrier wave signal C2, the first three-phase application voltage, the second three-phase application voltage, the first bus line current Iinv1, the second bus line current Iinv2 and the bus line current sum Iinv_sum, in the second embodiment of the present invention. FIG. 13 shows the relationship between respective parameters at the moment indicated by [1] in FIG. 12 described above.

As can be seen from FIG. 13, similarly to FIG. 8, the period in which the first power converter 4a outputs an effective vector is shifted towards timing t1, compared to the timing at which the second power converter 4b outputs an effective vector, in the period between timing t1 and timing t2, and is shifted towards timing t3, in the period between timing t2 and timing t3.

Consequently, as illustrated in FIG. 13, during the carrier period Tc, mode <2> in which the bus line current sum Iinv_sum is (Iv1+Iv2)/2 and mode <3> in which the bus line current sum Iinv_sum is (Iv1 +Iv2)/2 occur respectively two times each. As a result of this, the duration of mode <1> and the duration of mode <4> are reduced, and therefore, similarly to the first embodiment described above, it is possible to reduce the ripple current Ic of the smoothing capacitor 3.

Similar beneficial effects are obtained if the first offset voltage Voffset1 and the second offset voltage Voffset2 are not equal to each other and are both set to values less than 50% of the DC voltage Vdc. Furthermore, similar beneficial effects are obtained if the first offset voltage Voffset1 and the second offset voltage Voffset2 are both set to values greater than 50% of the DC voltage Vdc.

Figure 14:
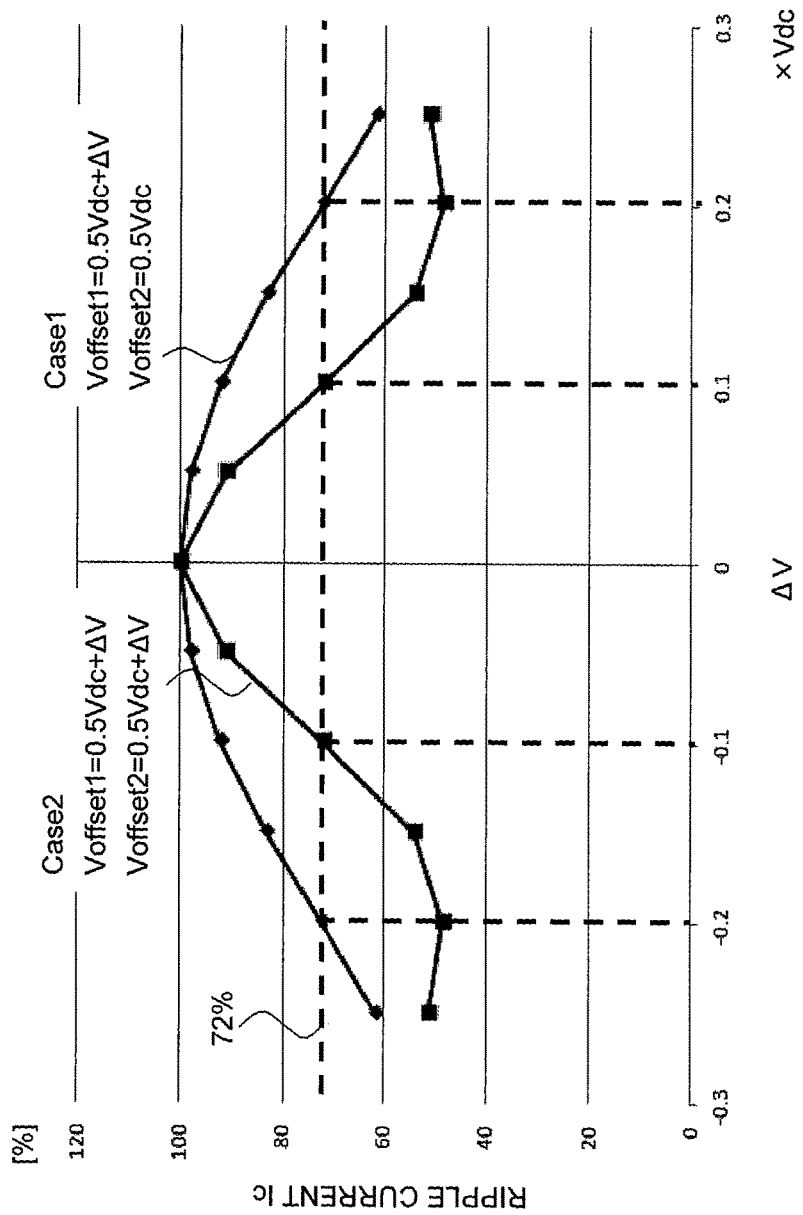
FIG. 14 is an illustrative diagram depicting change in the ripple current of a smoothing capacitor with respect to a first offset voltage and a second offset voltage in the second embodiment of the present invention.

Next, the further effects obtained by the second embodiment in comparison with the first embodiment described above will be explained with reference to FIG. 14. FIG. 14 is an illustrative diagram illustrating change in the ripple current Ic of the smoothing capacitor 3 with respect to the first offset voltage Voffset1 and the second offset voltage Voffset2, in the second embodiment of the present invention.

FIG. 14 depicts the ripple current Ic with respect to ΔV for a Case 1 which corresponds to the first embodiment described above, in which Vosffet1=0.5 Vdc+ΔV and Voffset2=0.5 Vdc.

Furthermore, FIG. 14 also depicts the ripple current Ic with respect to ΔV for a Case 2 which corresponds to the second embodiment described above, in which Vosffet1=0.5 Vdc+ΔV and Voffset2=0.5 Vdc+ΔV.

Moreover, FIG. 14 indicates each of the ripple currents Ic in relation to ΔV as absolute values, taking the ripple current Ic when ΔV=0 as a reference value of 100%.

As FIG. 14 reveals, in Case 2, it is possible to reduce the ripple current Ic of the smoothing capacitor 3 in relation to the same value of ΔV (apart from 0), compared to Case 1. In other words, if the ripple current Ic is reduced to the same value in Case 1 and Case 2, the value of ΔV can be made smaller in Case 2, than in Case 1.

For example, if the ripple current Ic is to be reduced to 72% in Case 1 and Case 2, then as can be seen from FIG. 14, it is necessary for ΔV to have a value of ΔV=±0.2 Vdc in Case 1. On the other hand, in Case 2, a ΔV value of ΔV=±0.1 Vdc is sufficient, and therefore if the ripple current Ic is reduced to the same value, the value of ΔV can be made smaller in Case 2, than in Case 1.

In this respect, making ΔV larger in the positive direction or negative direction is beneficial from the viewpoint of reducing the ripple current Ic. However, by making ΔV larger in the positive direction or the negative direction, the application voltage average Vave1' and the application voltage average Vave2' are displaced in the positive direction or negative direction from 0.5 Vdc. As a result of this, there is a disadvantage in that an imbalance occurs between the high potential-side switching elements and the low potential-side switching elements, in both the first power converter 4a and the second power converter 4b.

For example, if ΔV is increased in the positive direction in Case 1, then the first offset voltage Voffset1 becomes larger than 0.5 Vdc. As a result of this, the application voltages in the first three-phase application voltage are shifted in the positive direction, and therefore the application voltage average Vave1' is displaced in the positive direction from 0.5 Vdc.

Consequently, in the first power converter 4a, the activation time of the first high potential-side switching elements is longer than the activation time of the first low potential-side switching elements, and as a result of this, the heat generated by the first high potential-side switching elements becomes greater than the heat generated by the first low potential-side switching elements. In this case, in order to protect the first high potential-side switching elements, it is necessary, for example, to provide a restriction of some kind, such as limiting the voltage or current, etc., and therefore the torque or speed, etc. of the AC rotary machine 1 is limited.

Consequently, it is desirable for ΔV to be as close as possible to 0, in view of the balance between the activation time of the first high potential-side switching element and the activation time of the first low potential-side switching element. From this viewpoint, Case 2 is advantageous because the ripple current Ic can be reduced in a state where ΔV is closer to 0, compared to Case 1.

According to the second embodiment described above, compared to the first embodiment, the first offset voltage and the second offset voltage are both set to a value greater than 50% of the DC voltage or are both set to a value less than 50% of the DC voltage.

Consequently, similar beneficial effects to the first embodiment above are obtained, and furthermore, it is possible to reduce the ripple current of the smoothing capacitor while improving imbalance between the activation time of the high potential-side switching elements and the activation time of the low potential-side switching elements, respectively in the first power converter and the second power converter.

Third Embodiment

In the first and second embodiments, a case is described in which the first offset voltage Voffset1 and the second offset voltage Voffset2 are each uniform values. In contrast to this, in the third embodiment of the present invention, a case is described in which the first offset voltage Voffset1 and the second offset voltage Voffset2 are respectively switched to different values.

In the third embodiment, points which are the same as the first and second embodiments above are not explained and the points which are different from the first and second embodiments will be described.

Here, a state where the first offset voltage Voffset1 and the second offset voltage Voffset2 are set to be less than 0.5 Vdc is called a first setting state, and a state where the first offset voltage Voffset1 and the second offset voltage Voffset2 are set to be greater than 0.5 Vdc is called a second setting state.

Here, to give a specific example, in the first setting state, the first offset voltage Voffset1 and the second offset voltage Voffset2 are set to be 0.3 Vdc, and in the second setting state, the first offset voltage Voffset1 and the second offset voltage Voffset2 are set to be 0.7 Vdc.

Furthermore, the average value of the first offset voltage Voffset1 in the first setting state and the first offset voltage Voffset1 in the second setting state is set to be 0.5 Vdc. Similarly, it is desirable for the average value of the second offset voltage Voffset2 in the first setting state and the second offset voltage Voffset2 in the second setting state to be set to 0.5 Vdc.

In the third embodiment, the first offset calculator 7a alternately selects the first setting state and the second setting state, and calculates the first three-phase application voltage by using the first offset voltage Voffset1 in the selected setting state. Similarly, the second offset calculator 7b alternately selects the first setting state and the second setting state, and calculates the second three-phase application voltage by using the second offset voltage Voffset2 in the selected setting state.

Figure 15:
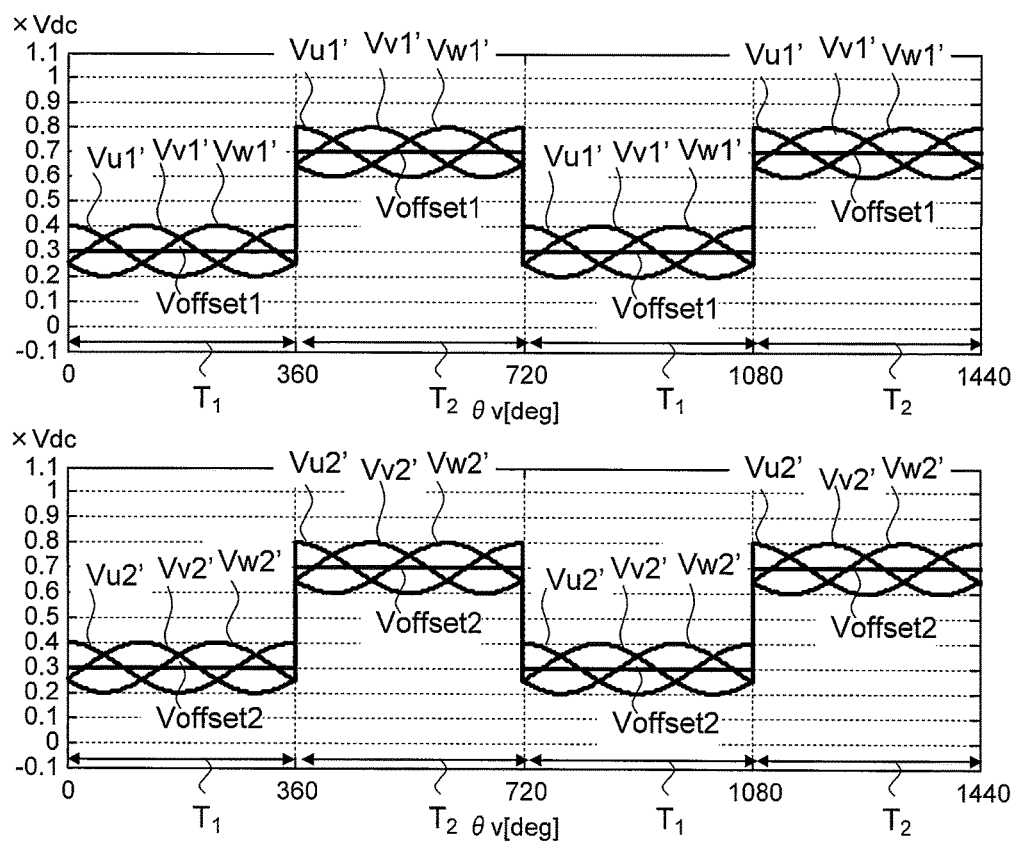
FIG. 15 is an illustrative diagram depicting a first three-phase application voltage and a second three-phase application voltage which are output from an offset calculator in a third embodiment of the present invention.

Next, the operation in which the first offset calculator 7a and the second offset calculator 7b each alternately select the first setting state and the second setting state will be described with reference to FIG. 15. FIG. 15 is an illustrative diagram depicting a first three-phase application voltage and a second three-phase application voltage which are output from an offset calculator 7 in a third embodiment of the present invention.

The waveforms of the respective application voltages in the first three-phase application voltage are depicted in the upper part of FIG. 15. Furthermore, the waveforms of the respective application voltages in the second three-phase application voltage are depicted in the lower part of FIG. 15.

The first three-phase voltage command and the second three-phase voltage command are taken to be the same as the first embodiment above.

As illustrated in FIG. 15, after the first setting state has continued in period T1, the state is switched from the first setting state to the second setting state, and after the second setting state has continued in period T2, the state is switched from the second setting state to the first setting state.

In this way, the first offset calculator 7a and the second offset calculator 7b each alternately select the first setting state and the second setting state, at a previously established setting timing. Desirably, period T1 and period T2 are set to the same value, and when set in this way, the first setting state and the second setting state are switched at predetermined times.

Here, for example, if the state is not switched from the first setting state to the second setting state, and the first setting state is continued, then in the first power converter 4a and the second power converter 4b, the activation time of the high potential-side switching elements is shorter than the activation time of the low potential-side switching elements, and a balance in heat generation cannot be achieved. Similarly, if the state is not switched from the first setting state to the second setting state, and the second setting state is continued, then in the first power converter 4a and the second power converter 4b, the activation time of the high potential-side switching elements is longer than the activation time of the low potential-side switching elements, and a balance in heat generation cannot be achieved.

However, as illustrated in FIG. 15, by alternately switching the first setting state and the second setting state, it is possible to improve the balance in heat generation, between the high potential-side switching elements and the low potential-side switching elements, in the first power converter 4a and the second power converter 4b.

The period T1 and the period T2 are set as indicated below on the basis of the respective thermal time constants of the first high potential-side switching elements, the first low potential-side switching elements, the second high potential-side switching elements and the second low potential-side switching elements.

In other words, the loss in the switching elements (for example, the conduction loss and/or switching loss, etc.) is estimated from the activation current of the switching elements which are used for the high potential-side switching elements and the low potential-side switching elements. Thereupon, since the temperature rise in the switching elements can also be estimated from the estimated loss and the thermal resistance, then the period T1 and the period T2 may be set on the basis of this temperature rise.

According to the third embodiment described above, the offset calculator alternately selects a first setting state in which the first offset voltage and the second offset voltage are set so as to be less than 50% of the DC voltage, and a second setting state in which the first offset voltage and the second offset voltage are set so as to be greater than 50% of the DC voltage, and calculates the first three-phase application voltage and the second three-phase application voltage by using the first offset voltage and the second offset voltage in the selected setting state.

Consequently, beneficial effects similar to the first and second embodiments are obtained, and furthermore, the heat generation balance between the high potential-side switching elements and the low potential-side switching elements can be improved, in both the first power converter and the second power converter.

Fourth Embodiment

In the third embodiment above, a case is described in which the first setting state and the second setting state are selected alternately at a preset setting timing. On the other hand, in the fourth embodiment of the present invention, a case is described in which the first setting state and the second setting state are selected alternately on the basis of the first three-phase voltage command or the second three-phase voltage command.

In the fourth embodiment, points which are the same as the first to third embodiments above are not explained and the points which are different from the first to third embodiments will be described.

Here, the voltage commands in the first three-phase voltage command input from the voltage command calculator 6 to the first offset calculator 7a are, in order of decreasing magnitude, a first maximum phase voltage command Vmax1, a first medium phase voltage command Vmid1, and a first minimum phase voltage command Vmin1. Furthermore, the voltage commands in the second three-phase voltage command input from the voltage command calculator 6 to the second offset calculator 7b are, in order or decreasing magnitude, a second maximum phase voltage command Vmax2, a second medium phase voltage command Vmid2 and a second minimum phase voltage command Vmin2.

Figure 16:
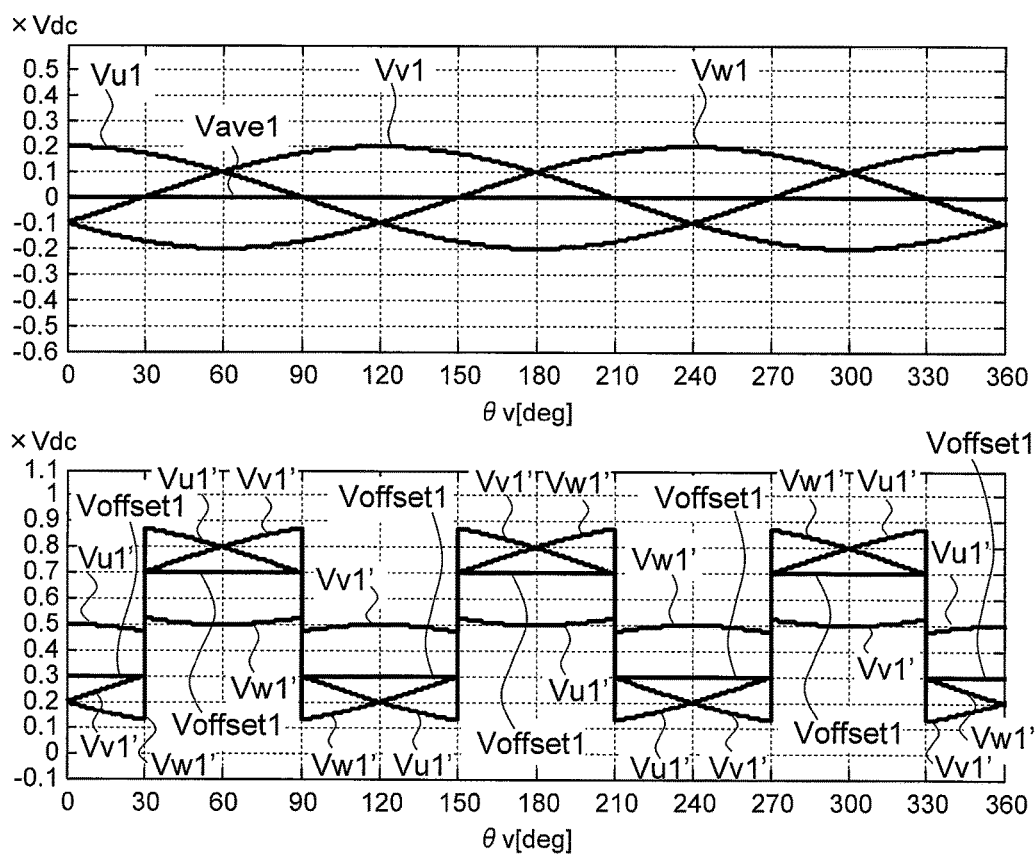
FIG. 16 is an illustrative diagram depicting a first three-phase voltage command output by the voltage command calculator, and a first three-phase application voltage output by the offset calculator, in a fourth embodiment of the present invention.

The operation in which the first offset calculator 7a and the second offset calculator 7b each alternately select the first setting state and the second setting state on the basis of the first three-phase voltage command or the second three-phase voltage command will be described with reference to FIG. 16. FIG. 16 is an illustrative diagram depicting a first three-phase voltage command output by the voltage command calculator 6, and a first three-phase application voltage output by the offset calculator 7, in the fourth embodiment of the present invention. In the fourth embodiment, the first offset calculator 7a and the second offset calculator 7b carry out similar operations, and therefore the description of the second offset calculator 7b is omitted here and the first offset calculator 7a is described.

The waveforms of the respective voltage commands in the first three-phase voltage are depicted in the upper part of FIG. 16. Furthermore, the waveforms of the respective application voltages in the first three-phase application voltage are depicted in the lower part of FIG. 16.

The waveforms of the voltage commands of the second three-phase voltage command are similar to the upper part in FIG. 16, and the waveforms of the application voltages in the second three-phase application voltage are similar to the lower part of FIG. 16.

The first offset calculator 7a compares the absolute value of the first maximum phase voltage command Vmax1 and the absolute value of the first minimum phase voltage command Vmin1, and if the absolute value of the first maximum phase voltage command Vmax1 is greater, selects the first setting state, and if the absolute value of the first maximum phase voltage command Vmax1 is not greater, selects the second setting state.

As illustrated in FIG. 16, when the voltage phase θv is in a range from 0 deg to 30 deg, then the absolute value of the first maximum phase voltage command Vmax1 (=Vu1) is greater than the absolute value of the first minimum phase voltage command Vmin1 (=Vw1), and therefore the first setting state is selected. Furthermore, when the voltage phase θv is in a range from 30 deg to 60 deg, then the absolute value of the first maximum phase voltage command Vmax1 (=Vu1) is not greater than the absolute value of the first minimum phase voltage command Vmin1 (=Vw1), and therefore the second setting state is selected.

In this way, the first offset calculator 7a compares the absolute value of the first maximum phase voltage command Vmax1 and the absolute value of the first minimum phase voltage command Vmin1, and selects the first setting state and the second setting state alternately in accordance with the comparison result.

Here, the purpose of switching between the first setting state and the second setting state is to improve the balance of heat generation between the high potential-side switching elements and the low potential-side switching elements, in each of the first power converter 4a and the second power converter 4b, as described in the third embodiment above. Furthermore, the problem of heat generation balance arises in particular when the AC rotary machine 1 is operated at a rotational speed close to zero.

In a case of this kind, the induced voltage which is proportional to the velocity of the AC rotary machine 1, and the voltage drop due to the reaction of the armature, are substantially zero, and the voltage applied to the first three-phase coil is substantially equal to the voltage drop in the wiring resistance of the first three-phase coil. Consequently, the first three-phase current flowing in the first three-phase coil is proportional to the first three-phase voltage command, and the second three-phase current flowing in the second three-phase coil is proportional to the second three-phase voltage command.

In the first power converter 4a, the switching element which generates the highest heat in the first high potential-side switching elements and the first low potential-side switching elements is the switching element corresponding to the phase of current having the greatest absolute value, from among the currents of the first three-phase current. Furthermore, the phase of the current having the greatest absolute value can be identified using the first three-phase voltage command, as the phase having the larger of the absolute value of first maximum phase voltage command Vmax1 and absolute value of the first minimum phase voltage command Vmin1.

Consequently, when the absolute value of the first maximum phase voltage command Vmax1 is greater than the absolute value of the first minimum phase voltage command Vmin1, then by selecting the first setting state, the heat generation balance between the first high potential-side switching elements and the first low potential-side switching elements is improved in the phase of the first maximum phase voltage command Vmax1.

Meanwhile, when the absolute value of the first maximum phase voltage command Vmax1 is not greater than the absolute value of the first minimum phase voltage command Vmin1, then by selecting the second setting state, the heat generation balance between the first high potential-side switching elements and the first low potential-side switching elements is improved in the phase of the first minimum phase voltage command Vmin1.

In the fourth embodiment, a case is described in which the first setting state and the second setting state are switched on the basis of the relative magnitudes of the absolute value of the first maximum phase voltage command Vmax1 and the absolute value of the first minimum phase voltage command Vmin1. However, the switching between the first setting state and the second setting state may also be based on the sign of the sum of the first maximum phase voltage command Vmax1 and the first minimum phase voltage command Vmin1.

In this case, if the sum of the first maximum phase voltage command Vmax1 and the first minimum phase voltage command Vmin1 is positive, then the first setting state is selected, and if the sum is not positive, then the second setting state is selected.

Furthermore, when the absolute value of the first maximum phase voltage command Vmax1 and the absolute value of the first minimum phase voltage command Vmin1 are compared, then if the absolute value of the first maximum phase voltage command Vmax1 is greater, the sign of the first medium phase voltage command Vmid1 is negative, and if the absolute value of the first maximum phase voltage command Vmax1 is not greater, the sign of the first medium phase voltage command Vmid1 is not negative.

Consequently, using characteristics such as these, the switching between the first setting state and the second setting state may be based on the sign of the first medium phase voltage command Vmid1. In this case, if the first medium phase voltage command Vmid1 is negative, then the first setting state is selected, and if the first medium phase voltage command Vmid1 is not negative, then the second setting state is selected.

Furthermore, similarly to the foregoing, the switching between the first setting state and the second setting state may be based on the relative magnitudes of the absolute value of the second maximum phase voltage command Vmax2 and the absolute value of the second minimum phase voltage command Vmin2.

Furthermore, the switching between the first setting state and the second setting state may be based on the sign of the sum of the second maximum phase voltage command Vmax2 and the second minimum phase voltage command Vmin2.

Moreover, the switching between the first setting state and the second setting state may be based on the sign of a second medium phase voltage command Vmid2.

According to the fourth embodiment described above, the offset calculator selects the first setting state when the absolute value of the first maximum phase voltage command is greater than the absolute value of the first minimum phase voltage command, when the absolute value of the second maximum phase voltage command is greater than the absolute value of the second minimum phase voltage command, when the sign of the first medium phase voltage command is negative, or when the sign of the second medium phase voltage command is negative. Furthermore, the offset calculator selects the second setting state when the absolute value of the first maximum phase voltage command is not greater than the absolute value of the first minimum phase voltage command, when the absolute value of the second maximum phase voltage command is not greater than the absolute value of the second minimum phase voltage command, when the sign of the first medium phase voltage command is not negative, or when the sign of the second medium phase voltage command is not negative. Consequently, similar beneficial effects to the third embodiment described above are obtained.

Fifth Embodiment

In the fourth embodiment described above, a case is described in which the first setting state and the second setting state are selected alternately on the basis of the first three-phase voltage command or the second three-phase voltage command. On the other hand, in the fifth embodiment of the present invention, a case is described in which the first setting state and the second setting state are selected alternately on the basis of the first three-phase current or the second three-phase current, which are detected current values.

In the fifth embodiment, points which are the same as the first to fourth embodiments above are not explained and the points which are different from the first to fourth embodiments will be described.

Figure 17:
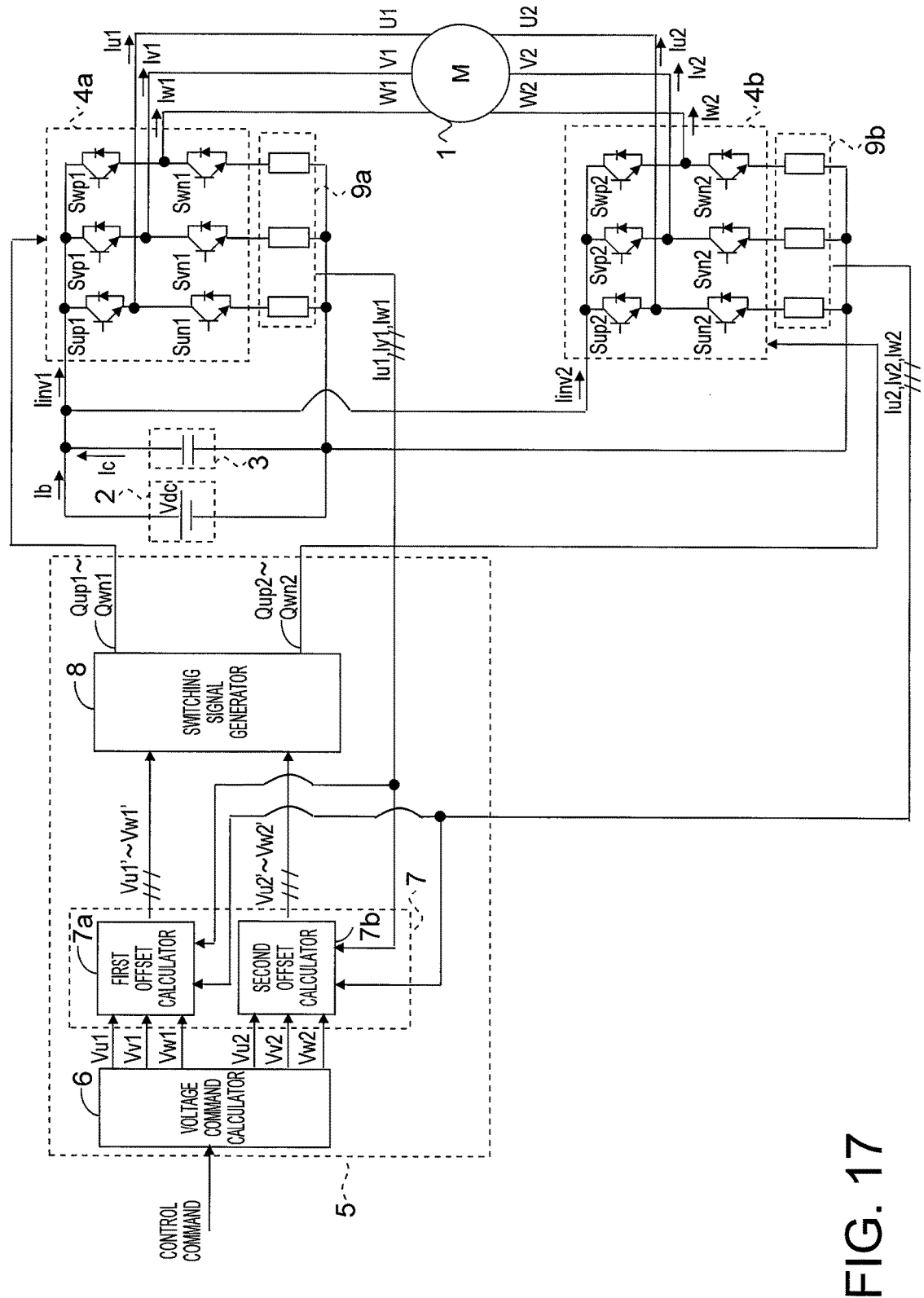
FIG. 17 is a schematic drawing showing the whole of a power conversion device according to a fifth embodiment of the present invention.

FIG. 17 is a schematic drawing showing the whole of a power conversion device according to the fifth embodiment of the present invention. As illustrated in FIG. 17, the power conversion device according to the fifth embodiment comprises a smoothing capacitor 3, a first power converter 4a, a second power converter 4b, a control unit 5, a first current detector 9a and a second current detector 9b.

The first current detector 9a detects the respective currents in the first three-phase current flowing in the first three-phase coil. To cite the specific configuration of the first current detector 9a, a current sensor, such as a shunt resistance or a meter current transformer (CT) is connected in series with the switching elements of the first low potential-side switching element.

The second current detector 9b detects the respective currents in the second three-phase current flowing in the second three-phase coil. To cite the specific configuration of the second current detector 9b, a current sensor, such as a shunt resistance or a meter current transformer (CT) is connected in series with the switching elements of the second low potential-side switching element.

The offset calculator 7 inputs the first three-phase current detected by the first current detector 9a and the second three-phase current detected by the second current detector 9b.

In this respect, the currents in the first three-phase currents detected by the first current detector 9a are, in order to decreasing magnitude, the first maximum current Imax1, the first medium current Imid1 and the first minimum current Imin1. Furthermore, the currents in the second three-phase currents detected by the second current detector 9b are, in order to decreasing magnitude, the second maximum current Imax2, the second medium current Imid2 and the second minimum current Imin2.

Figure 18:
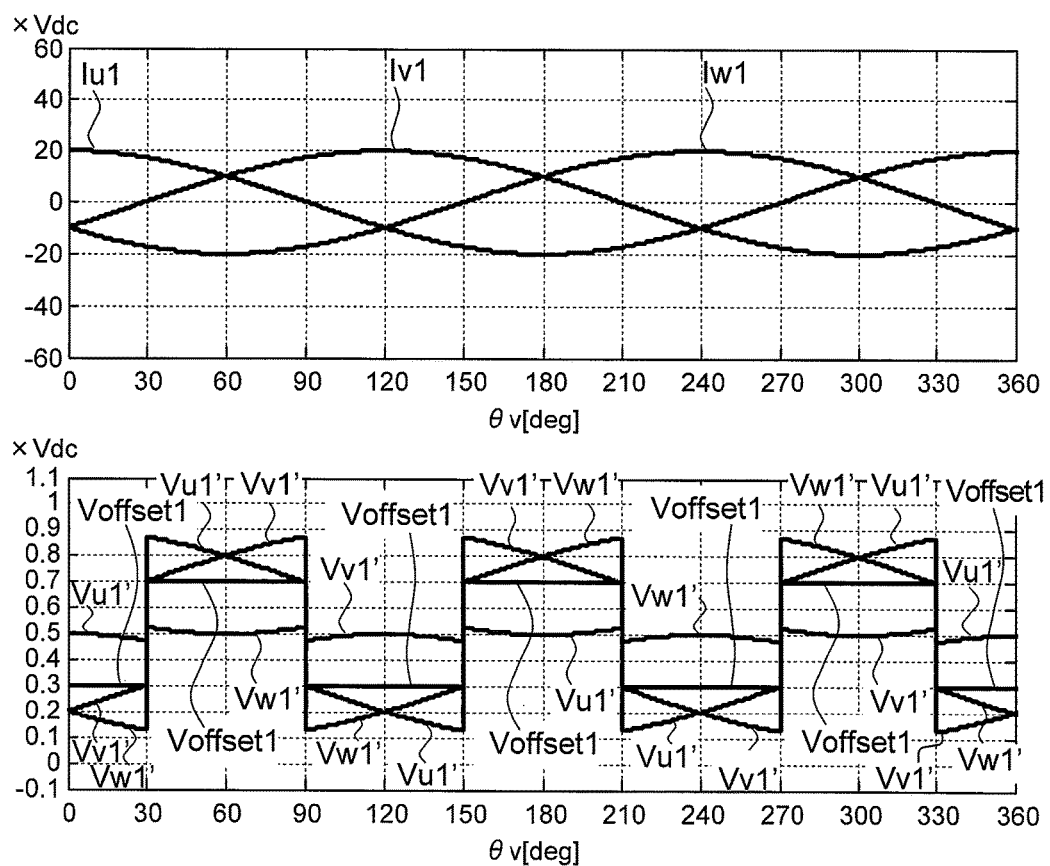
FIG. 18 is an illustrative diagram depicting the first phase current which is detected by the first current detector and the first three-phase application voltage output by the offset calculator, according to the fifth embodiment of the present invention.
Figure 19:
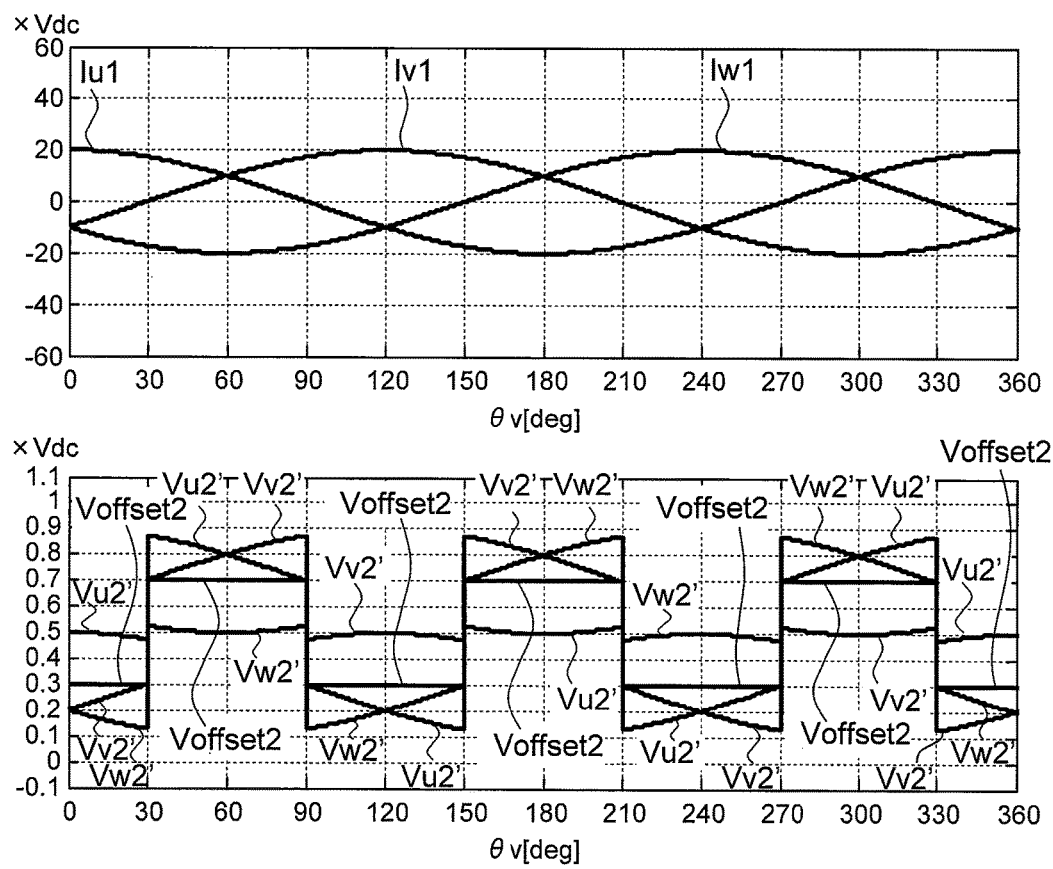
FIG. 19 is an illustrative diagram depicting the first phase current which is detected by the first current detector and the second three-phase application voltage output by the offset calculator, according to the fifth embodiment of the present invention.

Next, the operation in which the first offset calculator 7a and the second offset calculator 7b each alternately select the first setting state and the second setting state on the basis of the first three-phase current or the second three-phase current will be described with reference to FIG. 18 or FIG. 19. FIG. 18 is an illustrative diagram depicting the first phase current which is detected by the first current detector 9a and the first three-phase application voltage output by the offset calculator 7, according to a fifth embodiment of the present invention. FIG. 19 is an illustrative diagram depicting the first phase current which is detected by the first current detector 9a and the second three-phase application voltage output by the offset calculator 7, according to a fifth embodiment of the present invention.

The waveforms of the currents in the first three-phase current detected by the first current detector 9a are depicted in the upper part of FIG. 18. Furthermore, the waveforms of the respective application voltages in the first three-phase application voltage are depicted in the lower part of FIG. 18.

The first offset calculator 7a compares the absolute value of the first maximum current Imax1 and the absolute value of the first minimum current Imin1, and if the absolute value of the first maximum current Imax1 is greater, selects the first setting state, and if the absolute value of the first maximum current Imax1 is not greater, selects the second setting state.

As illustrated in FIG. 18, when the voltage phase θv is in a range from 0 deg to 30 deg, then the absolute value of the first maximum current Imax1 (=Iu1) is greater than the absolute value of the first minimum current Imin1 (=Iw1), and therefore the first setting state is selected. Furthermore, when the voltage phase θv is in a range from 30 deg to 60 deg, then the absolute value of the first maximum current Imax1 (=Iu1) is not greater than the absolute value of the first minimum current Imin1 (=Iw1), and therefore the second setting state is selected.

In this way, the first offset calculator 7a compares the absolute value of the first maximum current Imax1 and the absolute value of the first minimum current Imin1, and selects the first setting state and the second setting state alternately in accordance with the comparison result.

The waveforms of the currents in the first three-phase current detected by the first current detector 9a are depicted in the upper part of FIG. 19. Furthermore, the waveforms of the respective application voltages in the second three-phase application voltage are depicted in the lower part of FIG. 19.

The second offset calculator 7b compares the absolute value of the first maximum current Imax1 and the absolute value of the first minimum current Imin1, and if the absolute value of the first maximum current Imax1 is greater, selects the first setting state, and if the absolute value of the first maximum current Imax1 is not greater, selects the second setting state.

As illustrated in FIG. 19, when the voltage phase θv is in a range from 0 deg to 30 deg, then the absolute value of the first maximum current Imax1 (=Iu1) is greater than the absolute value of the first minimum current Imin1 (=Iw1), and therefore the first setting state is selected. Furthermore, when the voltage phase θv is in a range from 30 deg to 60 deg, then the absolute value of the first maximum current Imax1 (=Iu1) is not greater than the absolute value of the first minimum current Imin1 (=Iw1), and therefore the second setting state is selected.

In this way, the second offset calculator 7b, similarly to the first offset calculator 7a, compares the absolute value of the first maximum current Imax1 and the absolute value of the first minimum current Imin1, and selects the first setting state and the second setting state alternately in accordance with the comparison result.

A case is illustrated here in which the switching between the first setting state and the second setting state is based on the relative magnitudes of the absolute value of the first maximum current Imax1 and the absolute value of the first minimum current Imin1. However, the switching between the first setting state and the second setting state may be based on the relative magnitudes of the absolute value of the second maximum current Imax2 and the absolute value of the second minimum current Imin2.

In this case, the first offset calculator 7a and the second offset calculator 7b respectively compare the absolute value of the second maximum current Imax2 and the absolute value of the second minimum current Imin2, and select the first setting state when the absolute value of the second maximum current Imax2 is greater, and select the second setting state when the absolute value of the second maximum current Imax2 is not greater.

Furthermore, when the absolute value of the first maximum current Imax1 and the absolute value of the first minimum current Imin1 are compared, then if the absolute value of the first maximum current Imax1 is greater, the sign of the first medium current Imid1 is negative, and if the absolute value of the first maximum current Imax1 is not greater, the sign of the first medium current Imid1 is not negative.

Consequently, using characteristics such as these, the switching between the first setting state and the second setting state may be based on the sign of the first medium phase current Imid1. In this case, if the first medium phase current Imid1 is negative, then the first setting state is selected, and if the first medium phase current Imid1 is not negative, then the second setting state is selected.

Furthermore, when the absolute value of the second maximum current Imax2 and the absolute value of the second minimum current Imin2 are compared, then if the absolute value of the second maximum current Imax2 is greater, the sign of the second medium current Imid2 is negative, and if the absolute value of the second maximum current Imax2 is not greater, the sign of the second medium current Imid2 is not negative.

Consequently, using characteristics such as these, the switching between the first setting state and the second setting state may be based on the sign of the second medium phase current Imid2. In this case, if the second medium phase current Imid2 is negative, then the first setting state is selected, and if the second medium phase current Imid2 is not negative, then the second setting state is selected.

According to the fifth embodiment described above, the offset calculator selects the first setting state when the absolute value of the first maximum current is greater than the absolute value of the first minimum current, when the absolute value of the second maximum current is greater than the absolute value of the second minimum current, when the sign of the first medium current is negative, or when the sign of the second medium current is negative. Furthermore, the offset calculator selects the second setting state when the absolute value of the first maximum current is not greater than the absolute value of the first minimum current, when the absolute value of the second maximum current is not greater than the absolute value of the second minimum current, when the sign of the first medium current is not negative, or when the sign of the second medium current is not negative. Consequently, similar beneficial effects to the third and fourth embodiments described above are obtained.

In the fifth embodiment, a case is described in which the switching between the first setting state and the second setting state is based on the relative magnitudes of the absolute value of the first maximum current Imax1 and the absolute value of the first minimum current Imin1. However, the switching between the first setting state and the second setting state may also be based on the sign of the sum of the first maximum current Imax1 and the first minimum current Imin1. In this case, if the sum of the first maximum current Imax1 and the first minimum current Imin1 is positive, then the first setting state is selected, and if this sum is not positive, then the second setting state is selected.

Furthermore, the switching between the first setting state and the second setting state may be based on the sign of the sum of the second maximum current Imax2 and the second minimum current Imin2. In this case, if the sum of the second maximum current Imax2 and the second minimum current Imin2 is positive, then the first setting state is selected, and if this sum is not positive, then the second setting state is selected.

Furthermore, in the fifth embodiment, the following configuration may be adopted in cases where the control command input to the voltage command calculator 6 is a three-phase current command comprising a U-phase current command Iuref, a V-phase current command Ivref and a W-phase current command Iwref for the AC rotary machine 1. The current commands in the three-phase current command are, in order of decreasing magnitude, the maximum current command Imaxref, the medium current command Imidref, and the minimum current command Iminref.

In this case, the offset calculator compares the absolute value of the maximum current command Imaxref and the absolute value of the minimum current command Iminref, and if the absolute value of the maximum current command Imaxref is greater, selects the first setting state, and if the absolute value of the maximum current command Imaxref is not greater, selects the second setting state.

Furthermore, the state may be selected depending on the sign of the sum of the maximum current command Imaxref and the minimum current command Iminref, with the first setting state being selected if this sum is positive and the second setting state being selected if this sum is negative.

Furthermore, when the absolute value of the maximum current command Imaxref and the absolute value of the minimum current command Iminref are compared, if the absolute value of the maximum current command Imaxref is greater, then the sign of the medium current command Imidref is negative, and if the absolute value of the maximum current command Imaxref is not greater, then the sign of the medium current command Imidref is not negative.

Consequently, it is possible to use these characteristics and to select the first setting state if the medium current command Imidref is negative and to select the second setting state if the medium current command Imidref is not negative.

Sixth Embodiment

In the first to fifth embodiments described above, detection of a fault in the first power converter 4a and the second power converter 4b is not taken into consideration. However, in the sixth embodiment of the present invention, a case is described in which the detection of a fault of the first power converter 4a and the second power converter 4b is taken into consideration.

In the sixth embodiment, points which are the same as the first to fifth embodiments above are not explained and the points which are different from the first to fifth embodiments will be described.

Figure 20:
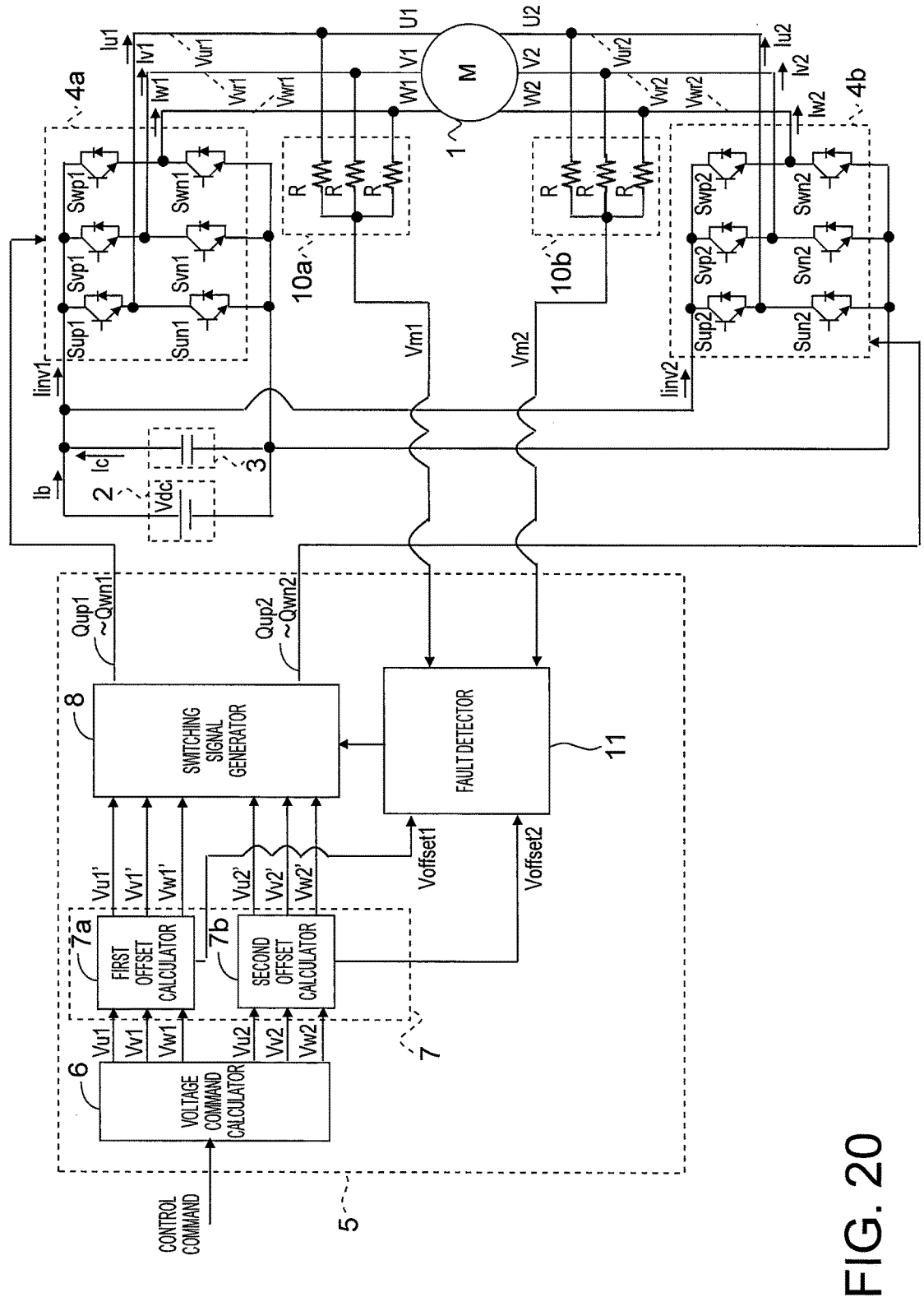
FIG. 20 is a schematic drawing showing the whole of a power conversion device according to a sixth embodiment of the present invention.

FIG. 20 is a schematic drawing showing the whole of a power conversion device according to the sixth embodiment of the present invention. As illustrated in FIG. 20, the power conversion device according to the sixth embodiment comprises a smoothing capacitor 3, a first power converter 4a, a second power converter 4b, a control unit 5, a first output voltage monitoring circuit 10a and a second output voltage monitoring circuit 10b.

Furthermore, the control unit 5 includes a voltage command calculator 6, an offset calculator 7 including a first offset calculator 7a and a second offset calculator 7b, a switching signal generator 8 and a fault detector 11.

The first output voltage monitoring circuit 10a detects a first voltage sum value Vm1 which is the sum of the first output voltages output to the AC rotary machine 1 by the first power converter 4a. More specifically, the first output voltage monitoring circuit 10a calculates the first voltage sum value Vm1 on the basis of the terminal voltages Vur1, Vvr1, Vwr1 of the U-phase coil U1, the V-phase coil V1 and the W-phase coil W1 of the first three-phase coil, and outputs the calculation result to the control unit 5.

The second output voltage monitoring circuit 10b detects a second voltage sum value Vm2 which is the sum of the second output voltages output to the AC rotary machine 1 by the second power converter 4b. More specifically, the second output voltage monitoring circuit 10b calculates the second voltage sum value Vm2 on the basis of the terminal voltages Vur2, Vvr2, Vwr2 of the U-phase coil U2, the V-phase coil V2 and the W-phase coil W2 of the second three-phase coil, and outputs the calculation result to the control unit 5.

The fault detector 11 detects a fault in the first power converter 4a and the second power converter 4b on the basis of the first offset voltage Voffset1, the second offset voltage Voffset2, the first voltage sum value Vm1 and the second voltage sum value Vm2, and outputs the detection result to the switching signal generator 8.

The switching signal generator 8 sets all of the switching signals Qup1 to Qwn1 to "0" if the fault detector 11 has determined that the first power converter 4a has failed. In this case, the supply of electric power from the first power converter 4a to the AC rotary machine 1 is stopped.

Furthermore, the switching signal generator 8 sets all of the switching signals Qup2 to Qwn2 to "0" if the fault detector 11 has determined that the second power converter 4b has failed. In this case, the supply of electric power from the second power converter 4b to the AC rotary machine 1 is stopped.

Next, the details of the first output voltage monitoring circuit 10a will be described. The first voltage sum value Vm1 at the point of passage through the resistance R from the respective coils of the first three-phase coil is given by Equation (1). More specifically, the first voltage sum value Vm1 is the sum of the terminal voltages Vur1, Vvr1, Vwr1 of the coils in the first three-phase coil.

$$Vm1=(Vur1+Vvr1+Vwr1)/3 \qquad (1)$$

Furthermore, the application voltages in the first three-phase application voltage output by the offset calculator 7a are obtained by adding an AC component having a phase difference of $2\pi/3$ in each phase, to the first offset voltage Voffset1, and therefore are expressed by Equations (2) to (4) below. Vamp1 is the amplitude of the first three-phase voltage command output by the voltage command calculator 6.

$$Vu1'=Vamp1 \cdot COS(\theta v)+Voffset1 \qquad (2)$$

$$Vv1'=Vamp1 \cdot COS(\theta v-\pi/3)+Voffset1 \qquad (3)$$

$$Vw1'=Vamp1 \cdot COS(\theta v+2\pi/3)+Voffset1 \qquad (4)$$

Here, the first three-phase application voltage and the terminal voltages in the first three-phase coil are substantially equal when the switching elements Sup1 to Swn1 of the first power converter 4a are operating normally. In other words, Vu1' ≅ Vur1, Vv1' ≅ Vvr1, Vw1' ≅ Vwr1. Therefore, if Equations (2) to (4) are rewritten in view of this relationship, then Equations (5) to (7) below are established.

$$Vur1=Vamp1 \cdot COS(\theta v)+Voffset1 \qquad (5)$$

$$Vvr1=Vamp1 \cdot COS(\theta v-\pi/3)+Voffset1 \qquad (6)$$

$$Vwr1=Vamp1 \cdot COS(\theta v+2\pi/3)+Voffset1 \qquad (7)$$

Furthermore, if Equations (5) to (7) are substituted into Equation (1), then Equation (8) below is established.

$$Vm1=Voffset1/2 \qquad (8)$$

Consequently, if the first power converter 4a is operating normally, then as can be seen from Equation (8), the first voltage sum value Vm1 is one half of the first offset voltage Voffset1.

Next, a case in which the first three-phase coil has suffered a ground fault will be considered. In this respect, a ground fault means a fault in which the terminal voltage of at least one phase of the three-phase coil is uniform at the negative electrode-side potential of the DC power source 2. Furthermore, a ground fault occurs when at least one of the switching elements Sun1, Svn1, Swn1 of the first power converter 4a is always in an ON state, regardless of the respective states of the corresponding switching signals Qun1, Qvn1, Qwn1.

For example, a case is illustrated in which the switching element Sun1 is always ON, regardless of the state of the corresponding switching signal Qun1. In this case, if the first three-phase voltage command is given by Equations (2) to (4), then the terminal voltages Vur1 to Vwr1 of the first three-phase coil are expressed by Equations (9) to (11) below.

$$Vur1 = 0 \quad (9)$$

$$Vvr1 = Vamp1 \cdot \cos(\theta v - \pi/3) + Voffset1 \quad (10)$$

$$Vwr = Vamp1 \cdot \cos(\theta v + 2\pi/3) + Voffset1 \quad (11)$$

In this way, the terminal voltage Vur1 is a uniform value of 0 V, and the first voltage sum value Vm1 which is determined by substituting Equations (9) to (11) into Equation (1) is smaller than the value indicated by Equation (8). Furthermore, besides terminal voltage Vur1, if the other terminal voltages Vvr1 and Vwr1 are a uniform value of 0 V, then the first voltage sum value Vm1 in this case is smaller than the value indicated in Equation (8). In other words, whichever of the phases of the first three-phase coil suffers a ground fault, the first voltage sum value Vm1 changes and assumes a value smaller than that indicated by Equation (8).

From the foregoing, when a ground fault occurs in the first three-phase coil, the terminal voltage of at least one phase is uniform at the negative-side potential of the DC power source 2, and therefore the first voltage sum value Vm1 assumes a smaller value than when there is no ground fault.

Next, a case in which the first three-phase coil has suffered a power supply fault will be considered. In this respect, a power supply fault means a fault in which the terminal voltage of at least one phase of the three-phase coil is uniform at the positive electrode-side potential of the DC power source 2 (in other words, the DC voltage Vdc). Furthermore, a power supply fault occurs when at least one of the switching elements Sup1, Svp1, Swp1 of the first power converter 4a is always in an ON state, regardless of the respective states of the corresponding switching signals Qup1, Qvp1, Qwp1.

For example, a case is illustrated in which the switching element Sup1 is always ON, regardless of the state of the corresponding switching signal Qup1. In this case, if the first three-phase application voltage is given by Equations (2) to (4), then the terminal voltages Vur1 to Vwr1 of the first three-phase coil are expressed by Equations (12) to (14) below.

$$Vur1 = Vdc \quad (12)$$

$$Vvr1 = Vamp1 \cdot \cos(\theta v - \pi/3) + Voffset1 \quad (13)$$

$$Vwr1 = Vamp1 \cdot \cos(\theta i \, v + 2\pi/3) + Voffset1 \quad (14)$$

In this way, the terminal voltage Vur1 is a uniform value of Vdc, and the first voltage sum value Vm1 which is determined by substituting Equations (12) to (14) into Equation (1) is greater than the value indicated by Equation (8). Furthermore, besides terminal voltage Vur1, if the other terminal voltages Vvr1 and Vwr1 are uniformly Vdc, then the first voltage sum value Vm1 in this case is greater than the value indicated in Equation (8). In other words, whichever of the phases of the first three-phase coil suffers a power supply fault, the first voltage sum value Vm1 changes and assumes a value greater than that indicated by Equation (8).

From the foregoing, when a power supply fault occurs in the first three-phase coil, the terminal voltage of at least one phase is uniform at the positive-side potential of the DC power source 2, and therefore the first voltage sum value Vm1 assumes a larger value than when there is no earth shorting fault.

The second output voltage monitoring circuit 10b can be regarded as the same as the first output voltage monitoring circuit 10a. In other words, a power supply fault and a ground fault are detected by utilizing the fact that the second voltage sum value Vm2 which is obtained by summing the terminal voltages Vur2, Vvr2, Vwr2 of the coils of the second three-phase coil is greater in the event of a power supply fault, and smaller in the event of a ground fault, compared to when the second three-phase coil is normal.

The sixth embodiment utilizes the fact that the first voltage sum value Vm1 and the second voltage sum value Vm2 increase in the event of a power supply fault and decrease in the event of a ground fault, compared to when there is no fault. More specifically, the sixth embodiment utilizes the characteristic wherein the first voltage sum value Vm1 and the second voltage sum value Vm2 change in accordance with the presence or absence or a fault.

The fault detector 11 determines a fault in the first power converter 4a when the first voltage sum value Vm1 has deviated from a first reference tolerance range which is previously set in accordance with the first offset voltage Voffset1. Furthermore, the fault detector 11 determines a fault in the second power converter 4b when the second voltage sum value Vm2 has deviated from a second reference tolerance range which is previously set in accordance with the second offset voltage Voffset2.

More specifically, if the fault detector 11 determines a fault in the first power converter 4a, and the first voltage sum value Vm1 is lower than the value of a first reference tolerance range which is determined on the basis of the first offset voltage Voffset1, then a ground fault is determined, and if the first voltage sum value Vm1 is higher than the value of the first reference tolerance range, then a power supply fault is determined. Furthermore, if the fault detector 11 determines a fault in the second power converter 4b, and the second voltage sum value Vm2 is lower than the value of the second reference tolerance range which is determined on the basis of the second offset voltage Voffset2, then a ground fault is determined, and if the second voltage sum value Vm2 is higher than the value of the second reference tolerance range, then a power supply fault is determined.

In this way, in the sixth embodiment, it is possible to detect a fault in the first power converter 4a and the second power converter 4b.

In comparison with the first to fifth embodiments described above, the sixth embodiment is further provided with a first output voltage monitoring circuit that detects the first voltage sum value, which is the sum of the first output voltages output to the AC rotary machine by the first power converter, and a second output voltage monitoring circuit that detects the second voltage sum value, which is the sum of the second output voltages output to the AC rotary machine by the second power converter. Furthermore, the control unit also has a fault detector which determines that the first power converter is suffering a fault if the first voltage sum value has deviated from a first reference tolerance range which is set previously in accordance with the first offset voltage, and determines that the second power converter is suffering a fault if the second voltage sum value has deviated from a second reference tolerance range which is set previously in accordance with the second offset voltage.

Consequently, in addition to the beneficial effects in the first to fifth embodiments above, a further beneficial effect is obtained in that a fault in the first power converter or the second power converter can be detected.

In this respect, in the first to fifth embodiments, a case is considered in which the amplitude of the first three-phase voltage command increases. Furthermore, the application voltages in the first three-phase application voltage are, in order of decreasing magnitude, a first maximum application voltage, a first medium application voltage and a first minimum application voltage. Moreover, in this case, voltage saturation may occur due to the first minimum application voltage being lower than the minimum value of the first carrier wave signal C1, or due to the first maximum application voltage being higher than the maximum value of the first carrier wave signal C1.

Figure 21:
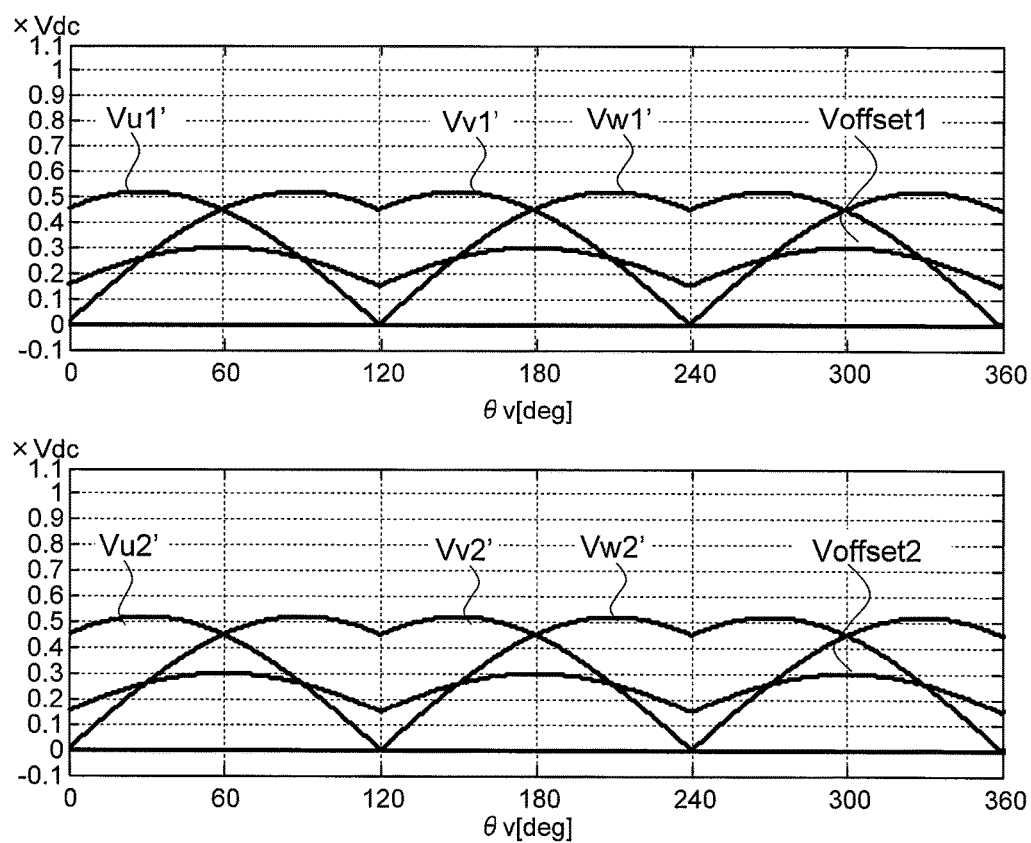
FIG. 21 is an illustrative diagram for describing a case in which the offset calculator changes the first offset voltage and the second offset voltage, in the sixth embodiment of the present invention.

Therefore, as illustrated in FIG. 21, the offset calculator 7 changes the first offset voltage Voffset1 and the second offset voltage Voffset2. FIG. 21 is an illustrative diagram for describing a case in which the offset calculator 7 changes the first offset voltage Voffset1 and the second offset voltage Voffset2, in the sixth embodiment of the present invention.

Here, the smallest voltage in the first three-phase application voltage output by the first offset calculator 7a is taken to be a first minimum application voltage and the smallest voltage in the second three-phase application voltage output by the second offset calculator 7b is taken to be a second minimum application voltage.

If the rotational speed of the AC rotary machine 1 is equal to or greater than a previously established rotational speed threshold value, or if the current command to the AC rotary machine 1 is equal to or greater than a previously established current command threshold value, or if the amplitude of the first three-phase voltage command is equal to or greater than a previously established amplitude threshold value, then the offset calculator 7 carries out the following operation.

In other words, as illustrated in FIG. 21, the offset calculator 7 changes the first offset voltage Voffset1 and the second offset voltage Voffset2 such that the first minimum application voltage is equal to 0, which is the minimum value of the first carrier wave signal C1, and the second minimum application voltage is equal to 0, which is the minimum value of the second carrier wave signal C2. Thereupon, the offset calculator 7 calculates the first three-phase application voltage and the second three-phase application voltage, by using the changed first offset voltage Voffset1 and second offset voltage Voffset2.

In this way, by changing the first offset voltage Voffset1 and the second offset voltage Voffset2 in accordance with the amplitude of the first three-phase voltage command, the offset calculator 7 is able to avoid voltage saturation. In other words, by switching the first offset voltage Voffset1 and the second offset voltage Voffset2 to a changing third setting state, in accordance with the amplitude of the first three-phase voltage command, the offset calculator 7 is able to avoid voltage saturation.

The offset voltages may also be set to a third setting state on the basis of the rotational speed of the AC rotary machine 1, which is proportional to the first three-phase voltage command. In this case, the offset calculator 7 switches to the third setting state when the rotational speed of the AC rotary machine 1 is greater than the rotational speed threshold value.

Furthermore, even if the ripple current Ic of the smoothing capacitor 3 exceeds the allowable value due to the occurrence of mode <4> described in the first to fifth embodiments, in the first three-phase application voltage and the second three-phase application voltage, it is still possible to reduce the ripple current Ic by switching to the third setting state.

In other words, a current command for the AC rotary machine 1 is set as a control command that is input to the voltage command calculator 6, and if the current command to the AC rotary machine 1 is equal to or greater than the current threshold value, then the offset calculator 7 is switched to the third setting state. Consequently, the ripple current Ic of the smoothing capacitor 3 can be decreased.

The invention claimed is:

1. A power conversion device to which a DC power source which outputs DC voltage and an AC rotary machine having a first three-phase coil and a second three-phase coil are connected, the power conversion device comprising:

a first power converter having a first high potential-side switching element and a first low potential-side switching element, and converting the DC voltage supplied from the DC power source into an AC voltage and applying the converted first AC voltage to the first three-phase coil;

a second power converter having a second high potential-side switching element and a second low potential-side switching element, and converting the DC voltage supplied from the DC power source into an AC voltage and applying the converted second AC voltage to the second three-phase coil; and a control unit which respectively controls the first high potential-side switching element and the first low potential-side switching element, and the second high potential-side switching element and the second low potential-side switching element, wherein the control unit includes:

a voltage command calculator which calculates a first three-phase voltage command for the first three-phase coil and a second three-phase voltage command for the second three-phase coil on the basis of a control command to the AC rotary machine, and outputs the calculated first three-phase voltage command and the second three-phase voltage command;

an offset calculator which calculates a first three-phase application voltage to be applied to the first three-phase coil by adding a first offset voltage having a value equal to or lower than the DC voltage to each voltage command in the first three-phase voltage command input from the voltage command calculator, and outputs the calculated first three-phase application voltage, and also calculates a second three-phase application voltage to be applied to the second three-phase coil by adding a second offset voltage having a value equal to or lower than the DC voltage to each voltage command in the second three-phase voltage command input from the voltage command calculator, and outputs the calculated second three-phase application voltage; and a switching signal generator which outputs a first switching signal to the first high potential-side switching element and the first low potential-side switching element by comparing the first three-phase application voltage input from the offset calculator with a first carrier wave signal, and outputs a second switching signal to the second high potential-side switching element and the second low potential-side switching element by comparing the second three-phase application voltage input from the offset calculator with a second carrier wave signal having the same carrier period as that of the first carrier wave signal and having a phase difference of 180° with respect to the first carrier wave signal; and the first power converter
applies the converted first AC voltage to the first three-phase coil by controlling the first high potential-side switching element and the first low potential-side switching element in accordance with the first switching signal input from the switching signal generator; and the second power converter
applies the converted second AC voltage to the second three-phase coil by controlling the second high potential-side switching element and the second low potential-side switching element in accordance with the second switching signal input from the switching signal generator; and when a vector comprising the output voltages of each phase in a case where the converted first AC voltage is output by the first power converter is taken to be a first voltage vector, and when the first voltage vector in a case where a first bus line current flowing into the first power converter is 0 is taken to be a zero vector, and when the first voltage vector in a case where the first bus line current flowing into the first power converter is not 0 is taken to be an effective vector, and when a vector comprising output voltages of each phase in a case where the converted second AC voltage is output by the second power converter is taken to be a second voltage vector, and when the second voltage vector in a case where the second bus line current flowing into the second power converter is 0 is taken to be a zero vector, and moreover when the second voltage vector in a case where the second bus line current flowing into the second power converter is not 0 is taken to be an effective vector, the first offset voltage and the second offset voltage are set in such a manner that a period during which one of the first power converter and the second power converter outputs the effective vector and the other thereof outputs the zero vector occurs in the carrier period of the first carrier wave signal and the second carrier wave signal.

2. The power conversion device according to claim 1, wherein the first offset voltage and the second offset voltage are set in such a manner that a period during which the first power converter and the second power converter both output the effective vectors does not occur in the carrier period.

3. The power conversion device according to claim 1, wherein one of the first offset voltage and the second offset voltage is set to a value of 50% of the DC voltage, and the other thereof is set to a value greater than 50% of the DC voltage or a value less than 50% of the DC voltage.

4. The power conversion device according to claim 1, wherein the first offset voltage and second offset voltage are both set to a value greater than 50% of the DC voltage or a value less than 50% of the DC voltage.

5. The power conversion device according to claim 4, wherein the first offset voltage and the second offset voltage are set to the same value as each other.

6. The power conversion device according to claim 1, wherein the offset calculator alternately selects a first setting state in which the first offset voltage and the second offset voltage each are set to a value less than 50% of the DC voltage, and a second setting state in which the first offset voltage and the second offset voltage each are set to a value greater than 50% of the DC voltage, and calculates the first three-phase application voltage and the second three-phase application voltage by using the first offset voltage and the second offset voltage in the selected setting state.

7. The power conversion device according to claim 6, wherein the offset calculator alternately switches and selects the first setting state and the second setting state at a previously established set timing.

8. The power conversion device according to claim 7, wherein the setting timing is determined on the basis of thermal time constants of the first high potential-side switching element, the first low potential-side switching element, the second high potential-side switching element and the second low potential-side switching element.

9. The power conversion device according to claim 6, wherein the offset calculator,
when the first three-phase voltage commands input from the voltage command calculator are taken to be a first maximum phase voltage command, a first medium phase voltage command, and a first minimum phase voltage command, in order of decreasing magnitude, and the second three-phase voltage commands input from the voltage command calculator are taken to be a second maximum phase voltage command, a second medium-phase voltage command and a second minimum-phase voltage command, in order of decreasing magnitude,
selects the first setting state, when an absolute value of the first maximum phase voltage command is greater than an absolute value of the first minimum phase voltage command, or when an absolute value of the second maximum phase voltage command is greater than an absolute value of the second minimum phase voltage command, or when a sign of the first medium phase voltage command is negative, or moreover when a sign of the second medium phase voltage command is negative; and
selects the second setting state, when the absolute value of the first maximum phase voltage command is not greater than the absolute value of the first minimum phase voltage command, or when the absolute value of the second maximum phase voltage command is not greater than the absolute value of the second minimum phase voltage command, or when the sign of the first medium phase voltage command is not negative, or moreover when the sign of the second medium phase voltage command is not negative.

10. The power conversion device according to claim 6, further comprising:
a first current detector which detects a first three-phase current flowing in the first three-phase coil; and
a second current detector which detects a second three-phase current flowing in the second three-phase coil, wherein
the offset calculator,
when the first three-phase currents detected by the first current detector are taken to be a first maximum current, a first medium current and a first minimum current, in order of decreasing magnitude, and when the second three-phase currents detected by the second current detector are taken to be a second maximum current, a second medium current and a second minimum current, in order of decreasing magnitude, selects the first setting state, when an absolute value of the first maximum current is greater than an absolute value of the first minimum current, or when an absolute value of the second maximum current is greater than an absolute value of the second minimum current, or when a sign of the first medium current is negative, or moreover when a sign of the second medium current is negative; and selects the second setting state, when the absolute value of the first maximum current is not greater than the absolute value of the first minimum current, or when the absolute value of the second maximum current is not greater than the absolute value of the second minimum current, or when the sign of the first medium current is not negative, or moreover when the sign of the second medium current is not negative.

11. The power conversion device according to claim 6, wherein the offset calculator, when three-phase current commands to the AC rotary machine are taken to be a maximum current command, a medium current command and a minimum current command, in order of decreasing magnitude;

selects the first setting state when an absolute value of the maximum current command is greater than an absolute value of the minimum current command, or when the sign of the medium current command is negative; and selects the second setting state when the absolute value of the maximum current command is not greater than the absolute value of the minimum current command, or when the sign of the medium current command is not negative.

12. The power conversion device according to claim 1, further comprising:

a first output voltage monitoring circuit which detects a first voltage sum value obtained by summing first output voltages output to the AC rotary machine by the first power converter; and a second output voltage monitoring circuit which detects a second voltage sum value obtained by summing second output voltages output to the AC rotary machine by the second power converter, wherein the control unit further includes:

a fault detector which determines that the first power converter is suffering a fault when the first voltage sum value has deviated from a first reference tolerance range which is set previously in accordance with the first offset voltage, and determines that the second power converter is suffering a fault when the second voltage sum value has deviated from a second reference tolerance range which is set previously in accordance with the second offset voltage.

13. The power conversion device according to claim 1, wherein the offset calculator, when the smallest voltage in the first three-phase application voltage is taken to be a first minimum application voltage and when the smallest voltage in the second three-phase application voltage is taken to be a second minimum application voltage, and in cases where the rotational speed of the AC rotary machine is equal to or greater than a rotational speed threshold value, or where the current command to the AC rotary machine is equal to or greater than the current command threshold value, or where an amplitude of the first three-phase voltage command is equal to or greater than an amplitude threshold value, changes the first offset voltage and the second offset voltage and calculates the first three-phase application voltage and the second three-phase application voltage by using the changed first offset voltage and second offset voltage, in such a manner that the first minimum application voltage becomes equal to a minimum value of the first carrier wave signal and the second minimum application voltage becomes equal to a minimum value of the second carrier wave signal.

* * * * *